US008660098B2

(12) United States Patent
Shimizu et al.

(10) Patent No.: US 8,660,098 B2
(45) Date of Patent: Feb. 25, 2014

(54) WIRELESS COMMUNICATION METHOD, BASE STATION APPARATUS AND WIRELESS COMMUNICATION SYSTEM

(75) Inventors: Yoshitaka Shimizu, Yokosuka (JP); Fusao Nuno, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 629 days.

(21) Appl. No.: 12/918,217

(22) PCT Filed: Jan. 14, 2009

(86) PCT No.: PCT/JP2009/050364
§ 371 (c)(1),
(2), (4) Date: Aug. 18, 2010

(87) PCT Pub. No.: WO2009/107413
PCT Pub. Date: Sep. 3, 2009

(65) Prior Publication Data
US 2011/0007720 A1 Jan. 13, 2011

(30) Foreign Application Priority Data

Feb. 27, 2008 (JP) .................................. 2008-046016

(51) Int. Cl.
*H04J 3/00* (2006.01)
*H04B 7/216* (2006.01)
*H04W 4/00* (2009.01)
(52) U.S. Cl.
USPC ............................ 370/336; 370/335; 370/329
(58) Field of Classification Search
USPC ................................. 370/336, 348, 329, 335
See application file for complete search history.

(56) References Cited

U.S. PATENT DOCUMENTS 6,697,346 B1 * 2/2004 Halton et al. ................. 370/335
8,102,804 B2 * 1/2012 Noh et al. ..................... 370/329
(Continued)

FOREIGN PATENT DOCUMENTS

| CN | 1195438 A | 10/1998 |
|---|---|---|
| CN | 1366750 A | 8/2002 |

(Continued)

OTHER PUBLICATIONS

Yoshitaka Shimizu et al., "Koiki Ubiquitous Network ni Okeru Yusen Seigyo Hoshiki no Teian", (Performance Evaluation of Prioritized Transmission Control Scheme for Wide Area Ubiquitous Network), IEICE Technical Report, vol. 107, No. 147, (2007 Nen 7 Gatsu 12 Nichi), pp. 107 to 112 (RCS2007-47) with English abstract.

(Continued)

*Primary Examiner* — Mark Rinehart
*Assistant Examiner* — Angel Brockman
(74) *Attorney, Agent, or Firm* — Harness, Dickey & Pierce, P.L.C.

(57) ABSTRACT

A base station apparatus includes a base-station receiver which receives information indicating the occurrence of the given event in the wireless terminal device, the information being transmitted from the wireless terminal device using the common slot. The base station apparatus includes a base-station transmission and reception manager which determines the number of random slots assigned as random slots to transmit the bandwidth request information for the given event among random slots in the random access period, based on the occurrence of the given event received by the base-station receiver. The base station apparatus includes a base-station transmitter which transmits, in the base station apparatus, information on the assigned random slots to the wireless terminal device of random access period.

11 Claims, 19 Drawing Sheets

(56) References Cited

U.S. PATENT DOCUMENTS

| | | | |
|---|---|---|---|
| RE43,323 E * | 4/2012 | Jurgensen et al. | 370/348 |
| 8,306,543 B2 * | 11/2012 | Lunter et al. | 455/450 |
| 2002/0167920 A1 * | 11/2002 | Miyazaki et al. | 370/329 |
| 2007/0004437 A1 * | 1/2007 | Harada et al. | 455/506 |
| 2008/0159334 A1 * | 7/2008 | Venkatachalam et al. | 370/479 |
| 2009/0103501 A1 * | 4/2009 | Farrag et al. | 370/337 |

FOREIGN PATENT DOCUMENTS

| | | |
|---|---|---|
| CN | 1949914 A | 4/2007 |
| CN | 101099309 A | 1/2008 |
| JP | 2007-329723 A | 12/2007 |

OTHER PUBLICATIONS

Yoshitaka Shimizu et al., "Koiki Ubiquitous Network ni Okeru Kyoyo Slot o Mochiita Yusen Seigyo Hoshiki ni Kansuru Kento" (Performance Evaluation of Prioritized Transmission Control Scheme using Shared Slot for Wireless Access in Wide Area Ubiquitous Network), 2008 Nen The Institute of Electronics, Information and Communication Engineers Sogo Taikai Koen Ronbunshu Tsushin 1, (2008 Nen 3 Gatso 5 Nichi), p. 502 (B-5-116), with partial English translation thereof.

Atsushi Ohta et al., "Development of an Advanced Wireless Access System in the 5GHz Band—MAC/DLC Functions" 2000 IEICE Society Conference B-5-39, p. 327, with partial English translation thereof.

First Office Action, Chinese Patent Application No. 200980105526.3, Aug. 31, 2012.

Second Office Action, Chinese Patent Application No. 200980105526.3, Jul. 24, 2013.

* cited by examiner

FIG. 5A

| INFORMATION ELEMENT | CONTENT |
|---|---|
| Data | BIT SEQUENCE PRESCRIBED FOR EACH EVENT |
| FCS | CRC |

FIG. 5B

| INFORMATION ELEMENT | CONTENT |
|---|---|
| Data | BIT SEQUENCE PRESCRIBED FOR EACH EVENT |
| FCS | CRC |
| TERMINAL Data | BIT SEQUENCE PRESCRIBED FOR EACH TERMINAL |
| TERMINAL FCS | CRC |

FIG. 6

| EVENT TYPE | SLOT INFORMATION |
|---|---|
| EVENT 1 | SLOT INFORMATION 1 (START POSITION) |
| : | : |
| EVENT N | SLOT INFORMATION N (START POSITION) |

| PREFERENTIAL CLASS | NUMBER OF RA | ACCESS INDICATION (TWO VALUES) |
|---|---|---|
| 1 | 2 | 0 |
| 2 | 8 | 1 |
| : | : | : |
| N | 4 | 0 |

WIRELESS COMMUNICATION METHOD, BASE STATION APPARATUS AND WIRELESS COMMUNICATION SYSTEM

CROSS-REFERENCE TO RELATED APPLICATIONS

This application is a 371 U.S. National Stage of International Application No. PCT/JP2009/050364, filed Jan. 14, 2009. This application claims the benefit of Japanese Patent Application No. JP2008-046016, filed Feb. 27, 2008. The entire disclosures of the above applications are incorporated by reference herein.

TECHNICAL FIELD

The present invention relates to a wireless communication method, a base station apparatus and a wireless communication system capable of dynamic bandwidth assignment.

This application claims priority to and the benefit of Japanese Patent Applications No. 2008-046016 filed on Feb. 27, 2008, the disclosure of which is incorporated herein by reference.

BACKGROUND ART

In recent years, ubiquitous networks using a wireless local and personal areas communication system such as wireless tags, Bluetooth (registered trademark), and ZigBee (registered trademark) have begun to be widely used in the fields of equipment control, traffic, distribution, environmental protection, food industry, agriculture, earthquake monitoring, health care and so on. With the development of applications or services, the number of users of a network is expected to increase in the future. Here, a global ubiquitous network capable of providing several applications or services to a greater number of users and enlarging a service area has been featured.

In such a situation, a network includes a base station connected to a fixed network, and a number of wireless terminals scattered in a wide area. The wireless terminals are directly accommodated in the base station. Further, the wireless terminals in such a network are driven by a battery and are low-power and low-performance terminals having only a minimum number of functions such as data measurement and transmission. Traffic from such wireless terminals to the base station is characterized by (1) a small amount of data and (2) a relatively long transmission interval.

Since a number of such wireless terminals are under one base station, traffic properties have a tendency of a great amount of uplink traffic and an increase of a total amount of traffic. In the network, one base station must accommodate as many wireless terminals as possible in order to collect data from the number of wireless terminals as many as possible. Accordingly, such a network needs a media access control (MAC) protocol capable of achieving high throughput and realizing a short transmission delay time while one base station efficiently accommodates a great number of low-performance wireless terminals.

To satisfy the requirement, a dynamic slot assignment (DSA) method that is a centralized control method is employed as a MAC protocol due to high resource utilization efficiency. The method uses a time division multiple access-time division duplex (TDMA-TDD) as an access scheme. In this method, a base station dynamically assigns slots (bandwidths) according to a request from a wireless terminal.

FIG. 21 shows an example of a configuration of a MAC frame. The MAC frame is divided into two periods: an uplink and a downlink. The downlink period consists of a broadcast period and a demand assignment period, and the uplink consists of a demand assignment period and a random access period.

Channels such as a broadcast control channel (Bch), a frame control channel (Fch), a random access feedback channel (RFch), a control channel (Cch), a data channel (Dch), and a random access channel (Rch) are used in each period in order to transmit and receive data or control information.

Bch is used to inform a wireless terminal of attribute information (e.g., a base station ID and a frame number) of a base station. Fch is used to notify bandwidth assignment information (e.g., a wireless terminal assigned, start point of the assignment, a channel type, and bandwidth amount) of a demand assignment period in which the bandwidth assignment is performed in units of wireless terminal.

RFch is used to notify of random access information (e.g., a random access result of a previous frame, a start position of random access in the present frame, and the number of slot). Cch is used to transmit and receive control information for each wireless terminal, such as a bandwidth request (resource request, RREQ) or automatic repeat request (ARQ). Dch is used to transmit and receive user data. Rch is a channel for random access and is used for the wireless terminal to transmit the bandwidth request (RREQ).

In a DSA method, a random access is mainly employed for a wireless terminal to request a bandwidth because it can accommodate aperiodic, bursty data flexibly and efficiently. FIG. 22 shows an example of an access sequence using the present method. In this example, the base station sequentially transmits Bch, Fch, and RFch from the beginning of a MAC frame. A wireless terminal under the base station can recognize a start position of Rch in the frame and the number of slot by receiving RFch. When the wireless terminal has data to transmit, the wireless terminal transmits bandwidth request information (RREQ) to request a bandwidth for data transmission to the base station using Rch. In this case, the wireless terminal voluntarily determines a back off time, which is a transmission deferred time, based on an exponential back off algorithm in order to avoid collision with other wireless terminals.

The wireless terminal transmits RREQ using the Rch immediately when the back off time is completed (MAC Frame 1 in FIG. 22). When there is a collision with Rch from another wireless terminal, the wireless terminal retransmits RREQ. When the base station correctly receives RREQ, the base station notifies of successful RREQ reception using RFch of a next frame (MAC Frame 2 in FIG. 22), and assigns Dch according to a bandwidth request value from RREQ. Further, in the next frame (MAC Frame 3 in FIG. 22) assigned Dch, the base station assigns Cch for ARQ to inform the wireless terminal of data acknowledgement. Non-Patent Document 1 is known as such a conventional art.

However, in the dynamic slot assignment method using the random access, particularly, when there are a number of wireless terminals under a base station, Rch is highly likely to collide with another Rch, which causes overhead. The overhead is the transmission deferred time caused by the exponential back off algorithm, which deteriorates a throughput characteristic. Accordingly, when a bandwidth request message for a bandwidth used for the event with an immediacy requirement is transmitted from the wireless terminal to the base station, it is difficult to transmit the bandwidth request message with a short delay time.

Now, we assume that a preferential class is requested to be the transmission with a short delay time. Further, to guarantee the preferential class, there is another method which sets the initial back off window (IBW) size of a preferential class to a smaller value rather than that of a non-preferential class. However, since the method uses a random access area for two classes, it is difficult to always guarantee the transmission of the preferential class regardless of the traffic in the non-preferential class. However, since effects of traffic in the non-preferential class cannot be ignored, it is difficult to always guarantee a transmission with a short delay time for the preferential class.

Non-Patent Document 1: Development of 5 GHz bandwidth advanced wireless access (AWA) system-MAC/DCL function-2000 IEICE Society Conference B-5-39 pp. 327.

DISCLOSURE OF INVENTION

Problem to be Solved by the Invention

The invention has been achieved in view of the above circumstances, and it is an object of the present invention to provide a wireless communication method, base station apparatus and wireless communication system that allow a wireless terminal device to transmit a bandwidth request message to request a bandwidth used for a given event such as an event with an immediacy requirement to a base station apparatus with a short delay time.

Means for Solving the Problem (1) The present invention provides a wireless communication method in which a plurality of wireless terminal devices are connected to a base station apparatus via a common wireless line, the base station apparatus managing an assignable period for wireless terminal in an uplink communication period of a wireless frame as a demand assignment period and a remaining period as a random access period, and assigning a requested uplink communication bandwidth according to bandwidth request information from the wireless terminal device, and the wireless terminal device transmitting the bandwidth request information using a random slot in the random access period when data to transmit is generated, and transmitting the data using the bandwidth assigned to an uplink demand assignment period form the base station apparatus when the bandwidth request information is successfully transmitted, wherein the wireless frame further includes a common slot for transmitting information notifying of an occurrence of a given event, and the method includes: transmitting, by the wireless terminal device, information indicating the occurrence of the given event in the wireless terminal device to the base station apparatus using the common slot; determining, by the base station apparatus, the number of random slots assigned as random slots to transmit the bandwidth request information for the given event among random slots in the random access period, based on the occurrence of the given event transmitted in the transmission of the information indicating the occurrence of the given event; transmitting, by the base station apparatus, information on the assigned random slots to the wireless terminal device of random access period; and transmitting, by the wireless terminal device, the bandwidth request information to the base station apparatus using the random slots assigned.

(2) In the wireless communication method of the present invention, when the occurrence of a given event is notified in the transmission of the information indicating the occurrence of the given event, the base station apparatus may change the number of the random slots assigned to the wireless terminal device.

(3) In the wireless communication method of the present invention, the base station apparatus may change the number of random slots assigned as random slots to the wireless terminal device, based on whether the information indicating the occurrence of the given event transmitted from the wireless terminal device in the transmission of the information indicating the occurrence of the given event is being retransmitted or not.

(4) In the wireless communication method of the present invention, the common slots may have a first common slot and a second common slot, and in the transmission of the information indicating the occurrence of the given event, the wireless terminal device: may transmit the information indicating the occurrence of the given event using the first common slot when the information indicating the occurrence of the given event is not being retransmitted to the base station apparatus; and may transmit the information indicating the occurrence of the given event using the second slot when the information indicating the occurrence of the given event is being retransmitted to the base station apparatus.

(5) The present invention provides a base station apparatus which connects a plurality of wireless terminal devices via a common wireless line, managing an assignable period for wireless terminal in an uplink communication period of a wireless frame as a demand assignment period and a remaining period as a random access period, and assigning a requested uplink communication bandwidth according to bandwidth request information from the wireless terminal device, wherein the wireless frame further includes a common slot for transmitting information notifying of an occurrence of a given event, and the base station apparatus includes: a base-station receiver which receives information indicating the occurrence of the given event in the wireless terminal device, the information being transmitted from the wireless terminal device using the common slot; a base-station transmission and reception manager which determines the number of random slots assigned as random slots to transmit the bandwidth request information for the given event among random slots in the random access period, based on the occurrence of the given event received by the base-station receiver; and a base-station transmitter which transmits, in the base station apparatus, information on the assigned random slots to the wireless terminal device of random access period.

(6) In the base station apparatus of the present invention, when the base-station receiver detects the occurrence of the given event from the wireless terminal device, the base-station transmission and reception manager may change the number of random slots assigned to the wireless terminal device.

(7) In the base station apparatus of the present invention, the base-station transmission and reception manager may change the number of random slots assigned as random slots to the wireless terminal device based on whether the information indicating the occurrence of the given event transmitted from the wireless terminal device is being retransmitted or not.

(8) The present invention provides a wireless communication system in which a plurality of wireless terminal devices are connected to a base station apparatus via a common wireless line, the base station apparatus managing an assignable period for wireless terminal in an uplink communication period of a wireless frame as a demand assignment period and a remaining period as a random access period, and assigning a requested uplink communication bandwidth according to bandwidth request information from the wireless terminal device, and the wireless terminal device transmitting the bandwidth request information using a random slot in the random access period when data to transmit is generated, and transmitting the data using the bandwidth assigned to an uplink demand assignment period form the base station apparatus when the bandwidth request information is successfully transmitted, wherein the wireless frame further includes a common slot for transmitting information notifying of an occurrence of a given event, the wireless terminal device includes: an event occurrence notification unit which transmits information indicating the occurrence of the given event in the wireless terminal device to the base station apparatus using the common slot; and a bandwidth requesting unit which transmits the bandwidth request information to the base station apparatus using random slots based on random slot assignment information transmitted from the base station apparatus, and the base station apparatus includes: a base-station receiver which receives information indicating the occurrence of the given event in the wireless terminal device, the information being transmitted from the wireless terminal device using the common slot; a base-station transmission and reception manager which determines the number of random slots assigned as random slots to transmit the bandwidth request information for the given event among random slots in the random access period, based on the occurrence of the given event received by the base-station receiver; and a base-station transmitter which transmits, in the base station apparatus, information on the assigned random slots to the wireless terminal device of random access period.

(9) In the wireless communication system of the present invention, when the base-station receiver detects occurrence of a given event from the wireless terminal device, the base-station transmission and reception manager may change the number of the random slots assigned to the wireless terminal device.

(10) In the wireless communication system of the present invention, the base-station transmission and reception manager may change the number of random slots assigned as random slots to the wireless terminal device based on whether the information indicating the occurrence of the given event transmitted from the wireless terminal device is being retransmitted or not.

(11) In the wireless communication system of the present invention, the common slots have a first common slot and a second common slot, and the event occurrence notification unit: transmits the information indicating the occurrence of the given event using the first common slot when the information indicating the occurrence of the given event is not retransmitted to the base station apparatus; and transmits the information indicating the occurrence of the given event using the second slot when the information indicating the occurrence of the given event is being retransmitted to the base station apparatus.

Effect of the Invention

According to the present invention, the wireless terminal device can transmit a bandwidth request message to request a bandwidth used for a given event such as an event with an immediacy requirement to the base station apparatus with a short delay time.

BRIEF DESCRIPTION OF THE DRAWINGS

FIG. 5A shows information elements and the content thereof transmitted using a common slot in the present embodiment.

FIG. 5B shows information elements and the content thereof transmitted in the common slot in the present embodiment.

FIG. 6 shows an event type and slot information of common slot information in the first embodiment of the present invention.

REFERENCE SYMBOLS

1: base station, 2-1 to 2-N: wireless terminal, 11: base-station transceiver (base-station transmitter, base-station receiver), 12: base-station frame creating and disassembling unit, 13: base-station transmission and reception manager, 14: base-station common-slot manager, 15: base-station transmission and reception controller, 16: bandwidth manager, 21: terminal transceiver, 22: terminal frame creating and disassembling unit, 23: terminal transmission and reception manager, 24: terminal slot manager, 25: terminal transmission and reception controller

BEST MODE FOR CARRYING OUT THE INVENTION

Hereinafter, respective embodiments of the present invention will be described with reference to the accompanying drawings. First, a first embodiment of the present invention will be described.

First Embodiment

Figure 1:
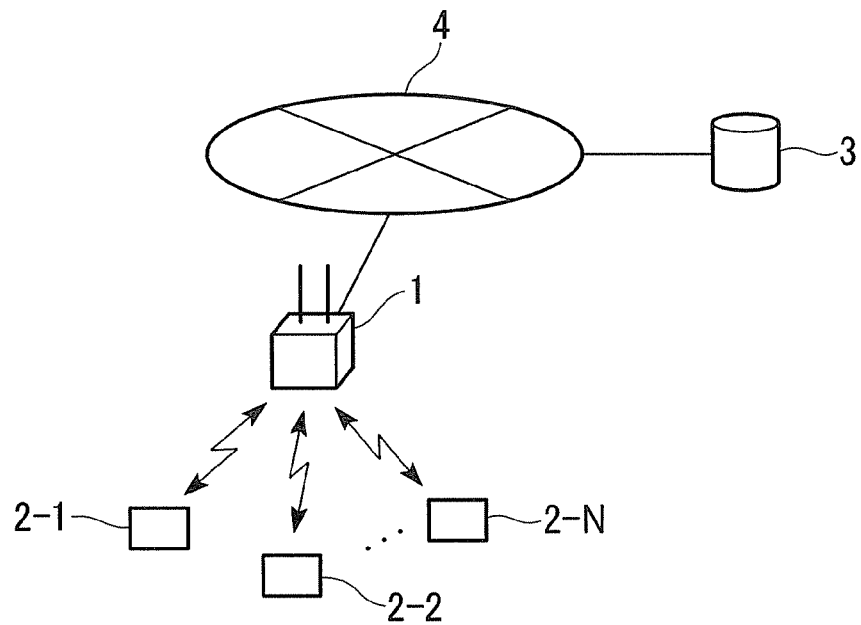
FIG. 1 is a schematic block diagram showing a wireless communication system according to a first embodiment of the present invention.

FIG. 1 is a schematic block diagram showing a wireless communication system according to a first embodiment of the present invention. The wireless communication system includes a base station 1, and wireless terminals 2-1 to 2-N (hereinafter, referred to as a wireless terminal 2 as a representative of the wireless terminals). The base station is also referred to as a base station apparatus. The wireless terminal is also referred to as a wireless terminal device. The base station 1 is connected to a wired network 4. A server 3 is also connected to the wired network 4. The base station 1 can communicate with the server 3 via the wired network 4.

Figure 2:
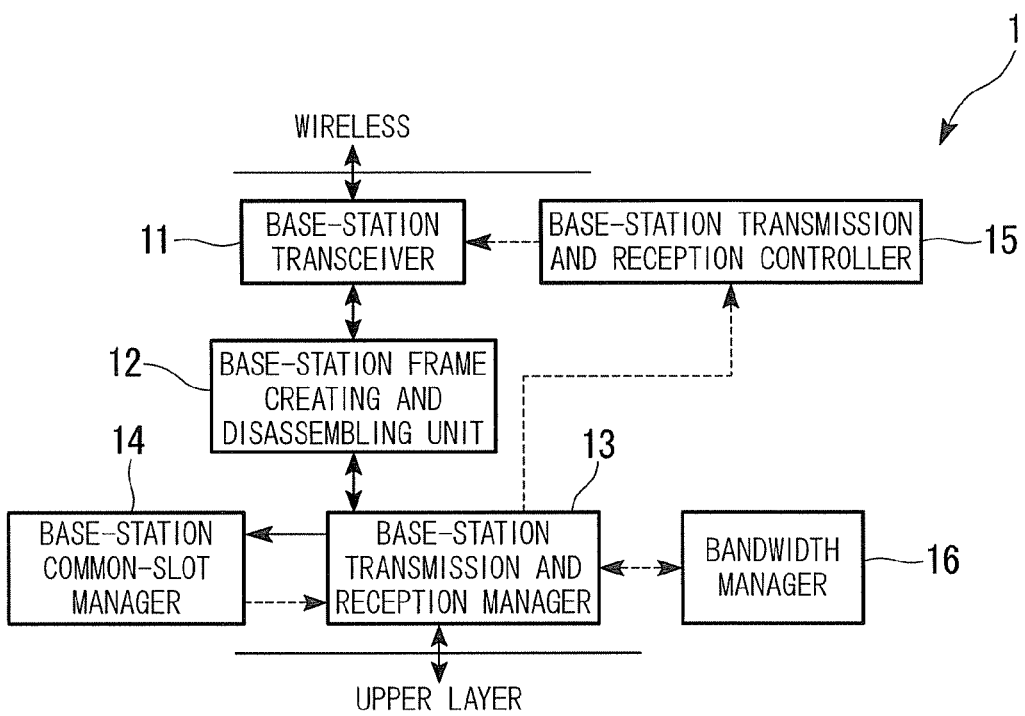
FIG. 2 is a functional block diagram showing a configuration of a base station 1 according to the first embodiment of the present invention.

Next, a configuration of the base station 1 of the present embodiment will be described. FIG. 2 is a functional block diagram showing a configuration of the base station 1 according to the first embodiment of the present invention. The base station 1 includes a base-station transceiver 11, a base-station frame creating and disassembling unit 12, a base-station transmission and reception manager 13, a base-station common-slot manager 14, a base-station transmission and reception controller 15, and a bandwidth manager 16.

The base-station transceiver 11 performs data transmission and reception to and from a terminal transceiver 21 of the wireless terminal 2, which will be described below. Where data received by the base-station transceiver 11 has been encrypted, the base-station frame creating and disassembling unit 12 performs decoding using an encryption key. Further, the base-station frame creating and disassembling unit 12 determines whether the received data is correct using cyclic redundancy check (CRC) for a received frame (Protocol Data Unit (PDU)) or not. The base-station transmission and reception manager 13 manages data transmission and reception in the base station. The base-station common-slot manager 14 manages PDU of a common slot, which will be described below. The base-station transmission and reception controller 15 calculates a data transmission and reception timing. The bandwidth manager 16 manages wireless bandwidths used for communication. In addition, a solid arrow in FIG. 2 indicates a flow of the data and a dotted arrow indicates a flow of a control signal.

Figure 3:
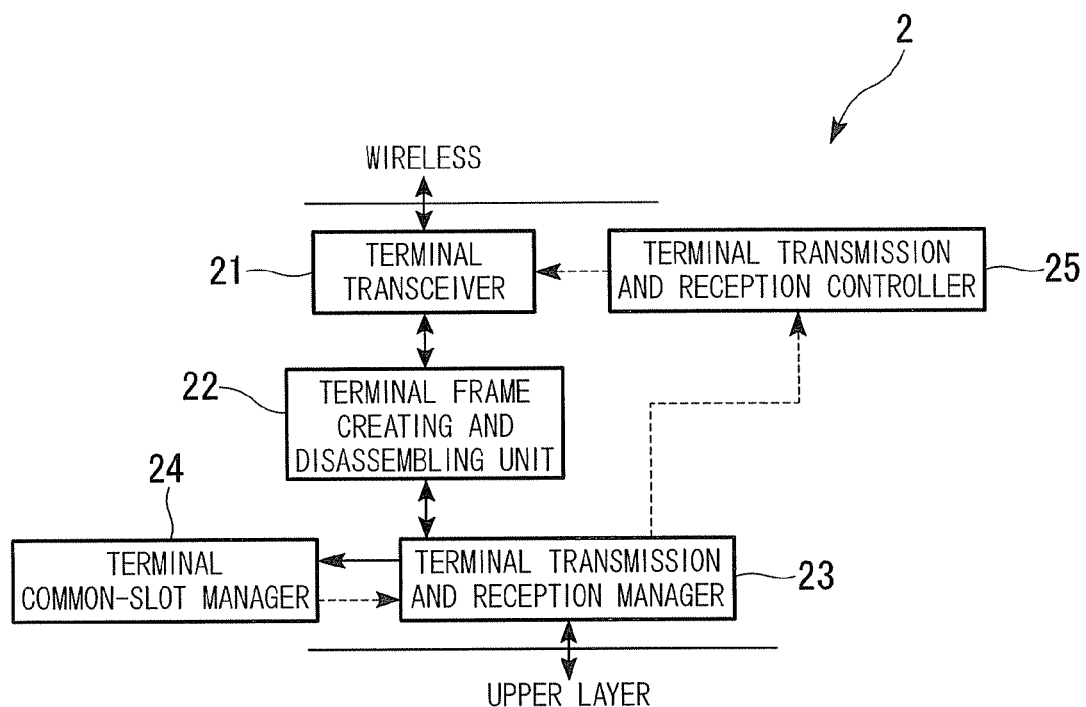
FIG. 3 is a functional block diagram showing a configuration of a wireless terminal 2 according to the first embodiment of the present invention.

Next, a configuration of the wireless terminal 2 of the present embodiment will be described. FIG. 3 is a functional block diagram showing a configuration of the wireless terminal 2 according to the first embodiment of the present invention. The wireless terminal 2 includes a terminal transceiver 21, a terminal frame creating and disassembling unit 22, a terminal transmission and reception manager 23, a terminal common-slot manager 24, and a terminal transmission and reception controller 25.

The terminal transceiver 21 transmits and receives data to and from the base-station transceiver 11 of the base station 1. The terminal transmission and reception manager 23 manages data transmission and reception in the wireless terminal 2. The terminal common-slot manager 24 specifies a position of a common slot available for transmission from common slot information. The terminal transmission and reception manager 25 calculates a transmission timing from the common slot position specified by the terminal common-slot manager 24. The frame creating and disassembling unit 22 creates a frame (PDU) from data to transmit. In FIG. 3, a solid arrow indicates a flow of the data and a dotted arrow indicates a flow of a control signal.

Figure 4:
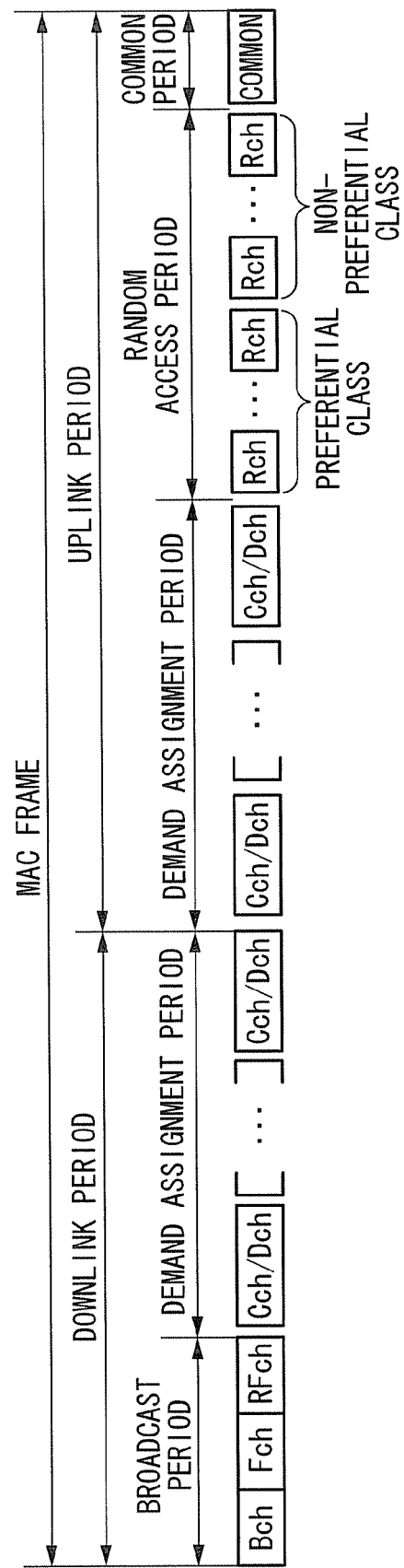
FIG. 4 shows a configuration of a MAC frame including a common access slot in the first embodiment of the present invention.

Next, a configuration of a MAC frame of the present embodiment will be described. FIG. 4 shows a configuration of a MAC frame including a common slot in the first embodiment of the present invention. The MAC frame is divided into two periods: an uplink and a downlink. The downlink period includes a broadcast period and a demand assignment period, and the uplink includes a demand assignment period, a random access period, and a common period.

Common slots included in the common period are used for the base station 1 to detect occurrence of traffic belonging to a preferential class. A method of detecting the occurrence of traffic will be described below. The number of the common slots included in the common period is one or more for one preferential class. In the present embodiment, the preferential class number is 1 and the number of common slot is 1.

In the present embodiment, the random access period is divided into Rch belonging to the preferential class and Rch belonging to a non-preferential class. The preferential class is a class to which Rch used for an event that is always required to be transmitted with a short delay time (event with an immediacy requirement) belongs. The non-preferential class is a class to which Rch other than Rch belonging to the preferential class belongs.

The base station 1 dynamically changes the ratio between Rch belonging to the preferential class and Rch belonging to the non-preferential class in the random access period according to traffic of an event belonging to the preferential class (an event with an immediacy requirement). The method of dynamically changing the ratio will be described below.

An example of the event with an immediacy requirement includes an event for which the wireless terminal 2 must immediately transmit the information to the base station 1, which is collecting event information. Specifically, an event in which the wireless terminal 2 must immediately transmit abnormality of an object monitored or observed by the wireless terminal 2 to the base station 1 when the object is abnormal is the event with an immediacy requirement.

Channels such as a broadcast control channel (Bch), a frame control channel (Fch), a random access feedback channel (RFch), a control channel (Cch), a data channel (Dch), and a random access channel (Rch) are used for each period in order to transmit and receive data or control information.

Although the common period is disposed after the random access period in the present embodiment, a position of the common period is not specified thereto. Further, although one common slot is disposed for one preferential class, a plurality of common slots may be disposed for the preferential class.

Further, the common slot may be distributed in the MAC frame. Further, information on an arrangement of the common slot is broadcasted from the base station 1.

Hereinafter, a method by which the base station 1 detects occurrence of traffic belonging to the preferential class (event with an immediacy requirement) in the present embodiment will be described.

A configuration of a frame (Protocol Data Unit (PDU)) transmitted using a common slot in the present embodiment will be described. FIG. 5A shows information elements and the content thereof transmitted using the common slot in the present embodiment. In the shown example, which has two lines, the content of the information element "data" is "BIT SEQUENCE PRESCRIBED FOR EACH EVENT", and the content of the information element "Frame Check Sequence (FCS)" is "CRC (Cyclic Redundancy Check)". FCS is created based on the data. In the present embodiment, the PDU consists of two information elements data and FCS, and the data is identifiable at each event. Further, since FCS is created based on the data, FCS is also common to events. That is, the PDU is common to the events. Further, when the same encryption key is used between the base station 1 and the wireless terminal 2, the encrypted PDU is the same, such that PDU can be encrypted and used. The PDU is not specified in the present configuration.

Terminal information may be included in the information element transmitted using the common slot. FIG. 5B shows information elements and the content thereof transmitted using the common slot. In a shown example, which has four lines, the content of the information element "data" is "BIT SEQUENCE PRESCRIBED FOR EACH EVENT", and the content of the information element "FCS (Frame Check Sequence)" is "CRC (Cyclic Redundancy Check)". The FCS is created based on the data. The content of the information element "terminal data" is "BIT SEQUENCE PRESCRIBED FOR EACH TERMINAL", and the content of the information element "terminal FCS (Frame Check Sequence)" is "CRC is used." The terminal FCS is created based on the terminal data. Where "terminal data" is included as the information element, the base station 1 receiving "terminal data" via the common slot may recognize a wireless terminal 2 that has transmitted a frame. That is, the base station 1 receiving the frame checks "terminal data" upon CRC, such that the base station 1 can confirm whether "terminal data" is destroyed during transmission or not. When the "terminal data" is destroyed during the transmission, the base station 1 may recognize that a wireless terminal 2 other than the wireless terminal 2 transmitting the frame that has reached the base station 1 is likely to transmit the frame using the same common slot.

Next, a notifying method by which the wireless terminal 2 notifies the base station 1 of an occurrence of an event with an immediacy requirement using the common slot and the PDU will be described. When the wireless terminal 2 notifies the base station 1 of the occurrence of the event with an immediacy requirement, the wireless terminal 2 transmits PDU for a common slot corresponding to the event, which is a transmission object. Information on the common slot in a MAC frame (common slot information) is broadcasted from the base station 1 to the wireless terminal 2 using RFch. The wireless terminal 2 acquires the common slot information broadcasted by the base station 1, specifies the common slot corresponding to the event, which is a transmission object, and notifies the base station 1 of the occurrence of the event with an immediacy requirement using the specified common slot.

FIG. 6 shows an event type and slot information of common slot information in the first embodiment of the present invention. In a shown example, which has N lines, the slot information of event type "Event 1" is "SLOT INFORMATION 1 (START POSITION)", and the slot information of event type "event N" is "SLOT INFORMATION N (START POSITION)". The event type is paired with the slot information so that the common slot corresponding to the event can be specified. The slot information is able to specify a transmission position, such as a slot start position. Further, when a plurality of common slots are disposed for one event with an immediacy requirement, slot information for the respective common slots is recorded as the slot information. Further, the format of the common slot information is not specified in the present configuration.

Figure 7:
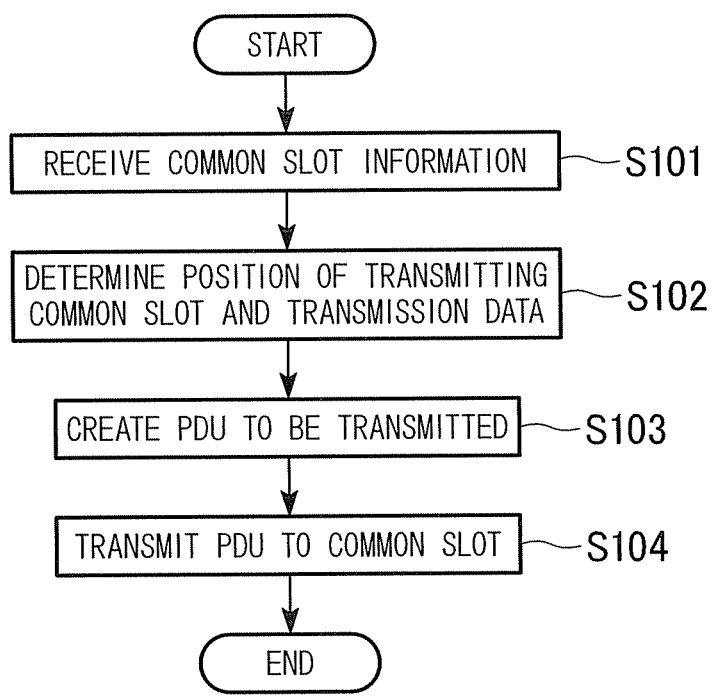
FIG. 7 is a flowchart showing a flow of a transmission process in the wireless terminal 2 in the first embodiment of the present invention.

FIG. 7 is a flowchart showing a flow of a transmission process in the wireless terminal 2 in the case where the wireless terminal 2 notifies the base station 1 of an occurrence of an event with an immediacy requirement (hereinafter, referred to as immediate event). In the wireless terminal 2 synchronized to a MAC frame that performs transmission and reception, the terminal transmission and reception manager 23 acquires common slot information based on data that the terminal transceiver 11 receives from the base station 1 (step S101). Subsequently, the terminal transmission and reception manager 23 notifies the terminal common-slot manager 24 of the common slot information. The terminal common-slot manager 24 specifies a start position of the common slot corresponding to the immediate event (hereinafter, referred to as a common slot start position) from the common slot information, and notifies the terminal transmission and reception manager 23 of the common slot start position and the immediate event type (step S102).

Subsequently, the terminal transmission and reception manager 23 notifies the terminal transmission and reception controller 25 of the common slot start position. The terminal transmission and reception controller 25 calculates a timing to transmit data notifying of the immediate event occurrence via the common slot. The terminal transmission and reception manager 23 also notifies the terminal frame creating and disassembling unit 22 of the immediate event type. The terminal frame creating and disassembling unit 22 creates the PDU from the immediate event type and notifies the terminal transceiver 21 of the PDU (step S103). The terminal transceiver 21 then transmits the PDU to the base station 1 at a timing indicated by the terminal transmission and reception controller 25 (step S104) and terminates the process.

Figure 8:
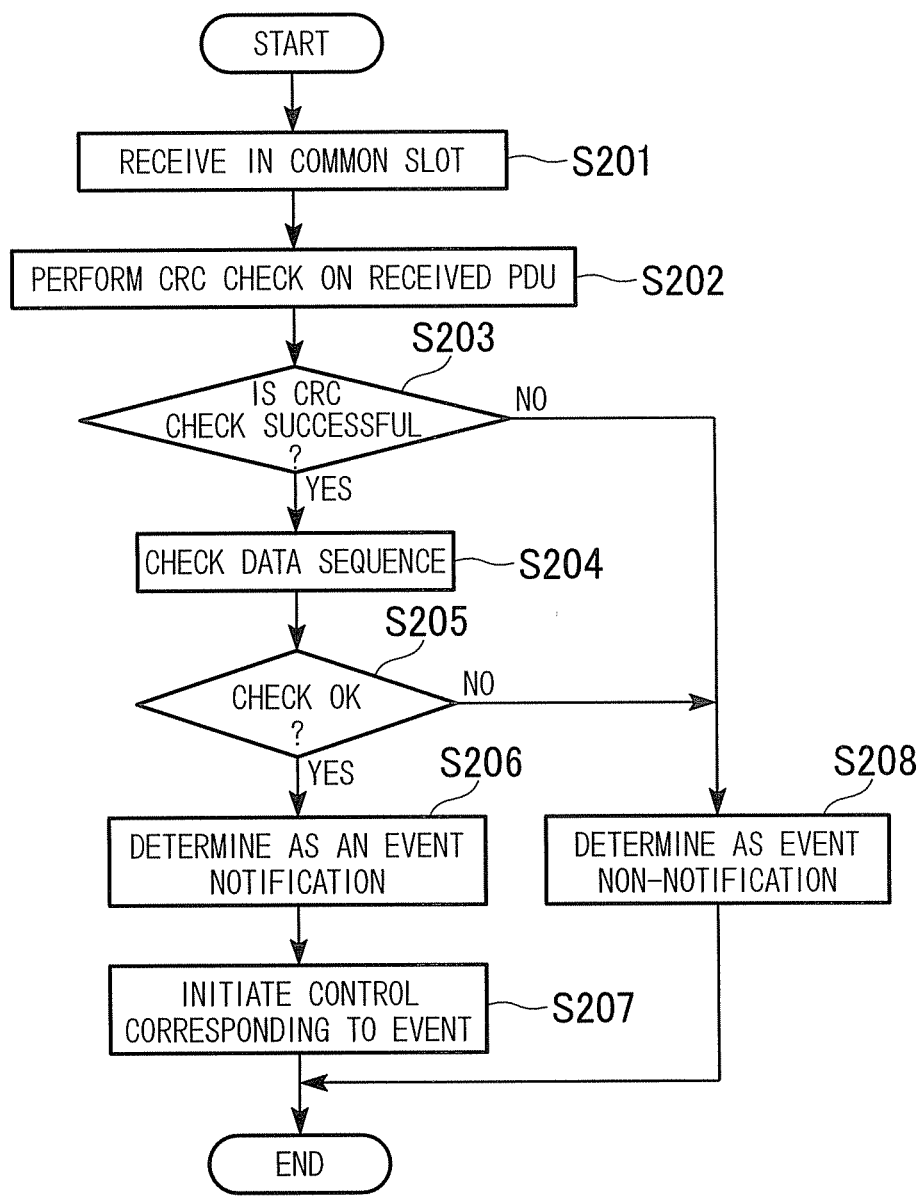
FIG. 8 is a flowchart showing a flow of a reception process in the base station 1 in the first embodiment of the present invention.

FIG. 8 is a flowchart showing a flow of a reception process in the base station 1 in the case where the wireless terminal 2 notifies the base station 1 of the occurrence of the immediate event. In the base station 1, the base-station transceiver 11 receives data of the common slot based on an indication of the base-station transmission and reception controller 15 (step S201). The base-station frame creating and disassembling unit 12 decodes the PDU included in the received common slot using an encryption key when the PDU has been encrypted. The base-station frame creating and disassembling unit 12 performs a CRC check on data in the received PDU (step S202). If the CRC check is successful, the process proceeds to step S204, otherwise, the process proceeds to step S208 (step S203).

In step S204, the base-station frame creating and disassembling unit 12 notifies the base-station common-slot manager 14 of the data in the PDU via the base-station transmission and reception manager 13. The base-station common-slot manager 14 checks if the notified data is the same as data of an immediate event corresponding to the received common slot (step S204). If the notified data is the same as data of an immediate event corresponding to the received common slot, the process proceeds to step S206, otherwise, the process proceeds to step S208 (step S205).

In step S206, the common slot manager 24 determines the PDU as a notification of the occurrence of the immediate event corresponding to the received common slot. The common slot manager 24 then notifies the base-station transmission and reception manager 13 of information indicating that the PDU is the notification of the occurrence of the immediate event corresponding to the received common slot (step S206). In addition, when the terminal information is included in the information element transmitted using the common slot, the common slot manager 24 performs a CRC check on the received terminal information using the terminal FCS. When the CRC check is successful, it is recognized that a single wireless terminal 2 has transmitted data using the common slot, and when the CRC check is not successful, it is recognized that a plurality of wireless terminals 2 have transmitted data using the common slot.

In step S207, the base-station transmission and reception manager 13 initiates control corresponding to the notified immediate event (step S207) and terminates the process. The control corresponding to the immediate event corresponds to processing in steps S901 to S903, which will be described below, in the present embodiment.

In step S208, the base-station common-slot manager 24 determines that the PDU is a non-notification of an immediate event corresponding to the received common slot (step S208) and terminates the process.

Thus, the base station 1 can be notified of generation of the traffic belonging to the preferential class (event with an immediacy requirement) from the wireless terminal 2 using the common slot and the PDU. Simultaneously, the base station 1 can recognize which immediate event occurs from the notification.

Hereinafter, a method by which the base station 1 dynamically changes the ratio between Rch belonging to the preferential class and Rch belonging to the non-preferential class in the random access period in the present embodiment will be described.

Figures 9, 10:
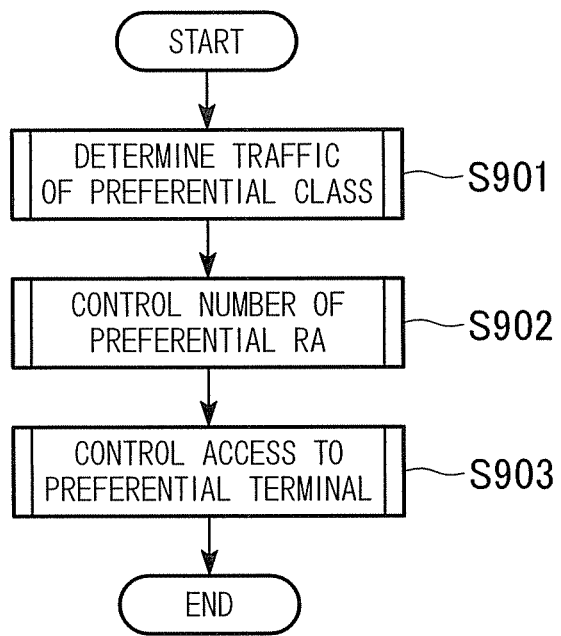
FIG. 9 is a flowchart showing a procedure by which the base station 1 dynamically changes the ratio between Rch belonging to a preferential class and Rch belonging to a non-preferential class in a random access period in the first embodiment of the present invention.
FIG. 10 shows preferential RA control information in the first embodiment of the present invention.

FIG. 9 is a flowchart showing a procedure by which the base station 1 dynamically changes the ratio between Rch belonging to the preferential class and Rch belonging to the non-preferential class in the random access period in the first embodiment of the present invention.

(Step S901) When there is an access to the common slot, the base-station transmission and reception manager 13 of the base station 1 determines that there is an access to the preferential class corresponding to the accessed common slot. The process then proceeds to step S902.

(Step S902) The base-station transmission and reception manager 13 determines a preferential random access (RA) number of the RA area in a next frame based on a traffic (access) situation determined in step S901 and preferential RA control information. The process then proceeds to step S903. A method of determining the number of preferential RA will be described in first and second concrete examples below.

(Step S903) The base-station transmission and reception manager 13 indicates an accessing method for the accessing wireless terminal 2 belonging to the preferential class based on the number of preferential RA determined in step S902. The process then ends. In the present embodiment, there are two accessing methods: a method of transmitting RREQ using one frame and a method of transmitting RREQ using a plurality of frames.

The base station 1 notifies all the wireless terminals 2 connected to the base station 1 of the number of preferential RA determined in step S902 and the accessing method determined in step S903, as preferential RA control information. For example, the base station 1 broadcasts the preferential RA control information to all the wireless terminals 2 connected to the base station 1 using RFch to notify the wireless terminals 2 of the preferential RA control information.

Next, preferential RA control information will be described. FIG. 10 shows preferential RA control information in the first embodiment of the present invention. The preferential RA control information has attributes such as a preferential class, the number of RA, and an access indication. In a shown example, N preferential classes from 1 to N are set. Each class consists of the number of RA that is an assigned the number of slot for the preferential class in RA, and the access indication.

The access indication has two values. The access indication value "0" indicates a method of transmitting RREQ using one frame. The access indication value "1" indicates a method of transmitting RREQ using a plurality of frames. In the shown example, the number of RA of the preferential class 1 is "2," and the access indication is "0." The number of RA and the access indications of the other preferential classes are as shown in FIG. 10.

The preferential classes included in the preferential RA control information may be recorded in an order of arrangement in an actual RA area. In this case, the wireless terminal 2 receives RFch and acquires a start position of the RA area and a total number of RA from RFch. Further, the wireless terminal 2 can specify a start slot (position) of an RA area of the class to which the wireless terminal 2 belongs, by using information of all classes present before the RA area of the class to which the wireless terminal 2 belongs from the preferential RA control information.

For example, in FIG. 10, since the number of slot of class 1 is 2, the wireless terminal 2 belonging to class 2 recognizes that 8 slots from a third slot (from a third slot to a tenth slot) are in an RA area of the wireless terminal 2 belonging to class 2. Meanwhile, since non-preferential classes exist in an RA area after the preferential classes, the position and the number of slot can be obtained by summing information for all the preferential classes.

Thus, the base station 1 can dynamically change a ratio between Rch belonging to the preferential class and Rch belonging to the non-preferential class in the random access period according to the traffic belonging to the preferential class.

Figure 11:
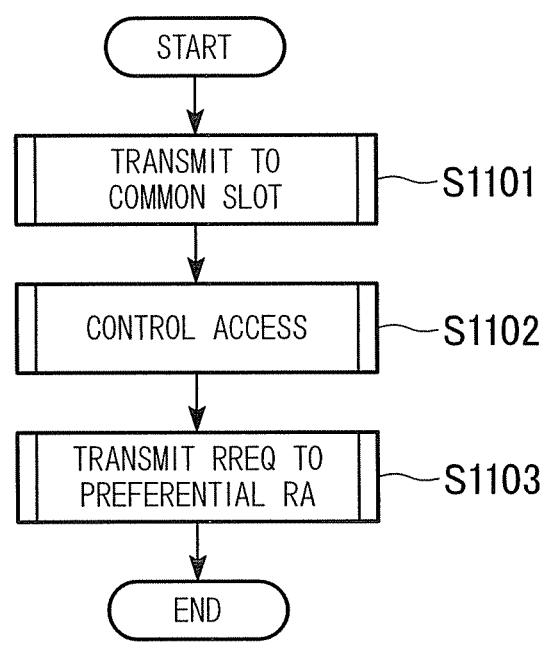
FIG. 11 is a flowchart showing a procedure by which a wireless terminal 2 transmits RREQ in the first embodiment of the present invention.

Hereinafter, a procedure by which the wireless terminal 2 transmits RREQ in the present embodiment will be described with reference to FIG. 11.

(Step S1101) When traffic (communication) of the preferential class is generated, the wireless terminal 2 notifies the base station 1 of generation of the traffic of the present preferential class using the common slot (processing in steps S101 to S104). The process then proceeds to step S1102. Specifically, the wireless terminal 2 acquires common slot information in RFch, acquires the position and number of the common slot, and notifies the base station 1 of the traffic generation according to a format defined for the common slot.

(Step S1102) The wireless terminal 2 acquires preferential RA control information included in RFch. Further, the wireless terminal 2 performs access control according to the access indication included in the preferential RA control information. The process then proceeds to step S1103.

(Step S1103) The wireless terminal 2 transmits RREQ to a corresponding preferential RA according to the access control performed in step S1102. The process then ends.

The wireless terminal 2 transmits RREQ according to the above-described procedure. In this case, a transmission timing at which the wireless terminal 2 transmits RREQ will be described with reference to FIG. 12.

Figure 12:
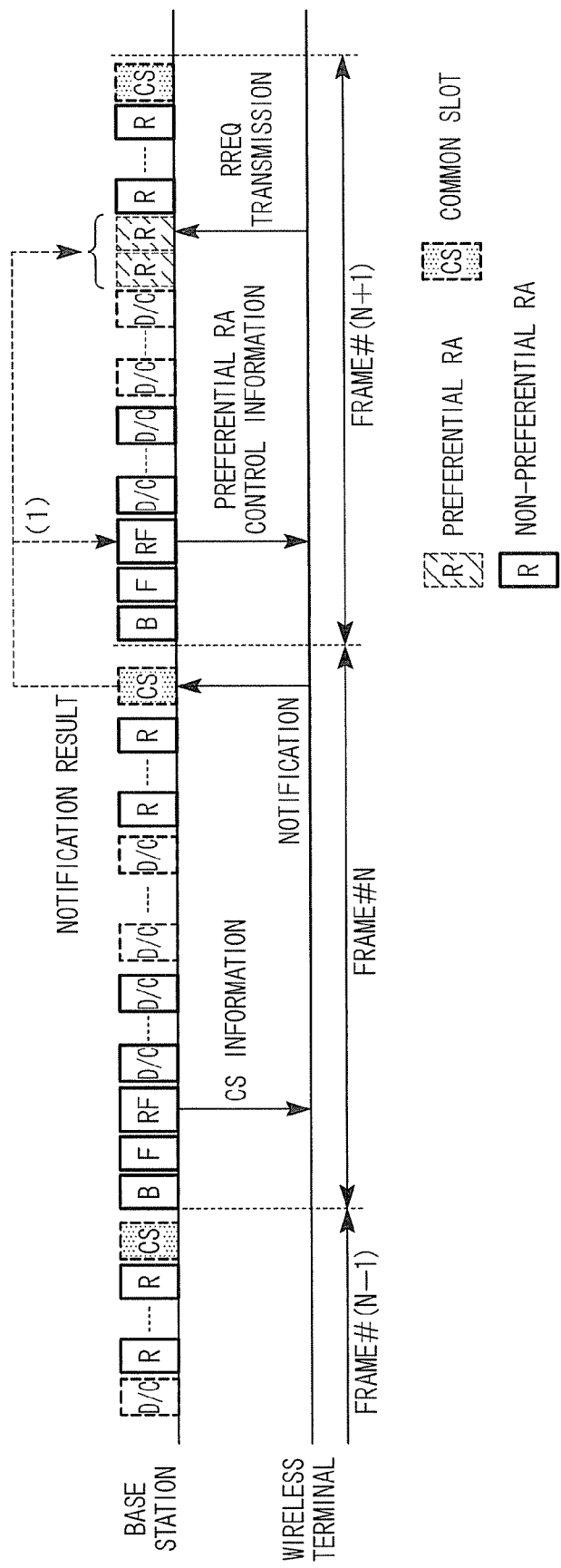
FIG. 12 is a sequence diagram showing an RREQ transmission timing in the first exemplary of the present invention.

FIG. 12 is a sequence diagram showing an RREQ transmission timing in the first embodiment of the present invention. Where a wireless terminal 2 in a preferential class has data (traffic) to transmit, the wireless terminal 2 transmits a notification to the common slot. In an example shown in FIG. 12, the wireless terminal 2 acquires common slot information from RFch in frame #N and transmits the notification to the common slot of frame #N.

The base station 1 determines the number of preferential RA of frame 190 (N+1) subsequent to frame #N and an accessing method based on the notification result of the common slot of frame #N. Further, the base station 1 broadcasts preferential RA control information including the determined the number of preferential RA and accessing method to the wireless terminal 2, using RFch of frame #(N+1).

The wireless terminal 2 acquires the preferential RA control information included in RFch of frame #(N+1), performs access control of frame #(N+1) based on the acquired preferential RA control information, and transmits RREQ to the preferential RA of frame #(N+1).

As described above, according to the first embodiment of the present invention, the base station 1 can assign Rchs to the immediate event by detecting the notification of an occurrence of the immediate event from the wireless terminals 2 and dynamically change the assignment of Rch included in the RA period based on the detected notification. Further, the wireless terminal 2 can transmit RREQ to the base station 1 using the assigned Rchs. Accordingly, the wireless terminal 2 can transmit a bandwidth request message (RREQ), which is a message requesting a bandwidth used for a given event such as an event with an immediacy requirement, to the base station 1 with a short delay time.

Next, a method of determining the number of preferential RA will be described using the first and second concrete examples. The first and second concrete examples follow an RREQ transmission sequence described with reference to FIG. 12. In addition, there is a difference in a format of the common slot between the first concrete example and the second concrete example. This yields a difference in a method of determining traffic of the preferential class and a method of controlling the number of preferential RA in a process flow in the base station 1. The access control of a preferential terminal of the second concrete example is the same as that of the first concrete example. The process flow of the wireless terminal 2 described with reference to FIG. 11 of the second concrete example is the same as that of the first concrete example.

FIRST CONCRETE EXAMPLE

Figure 13:
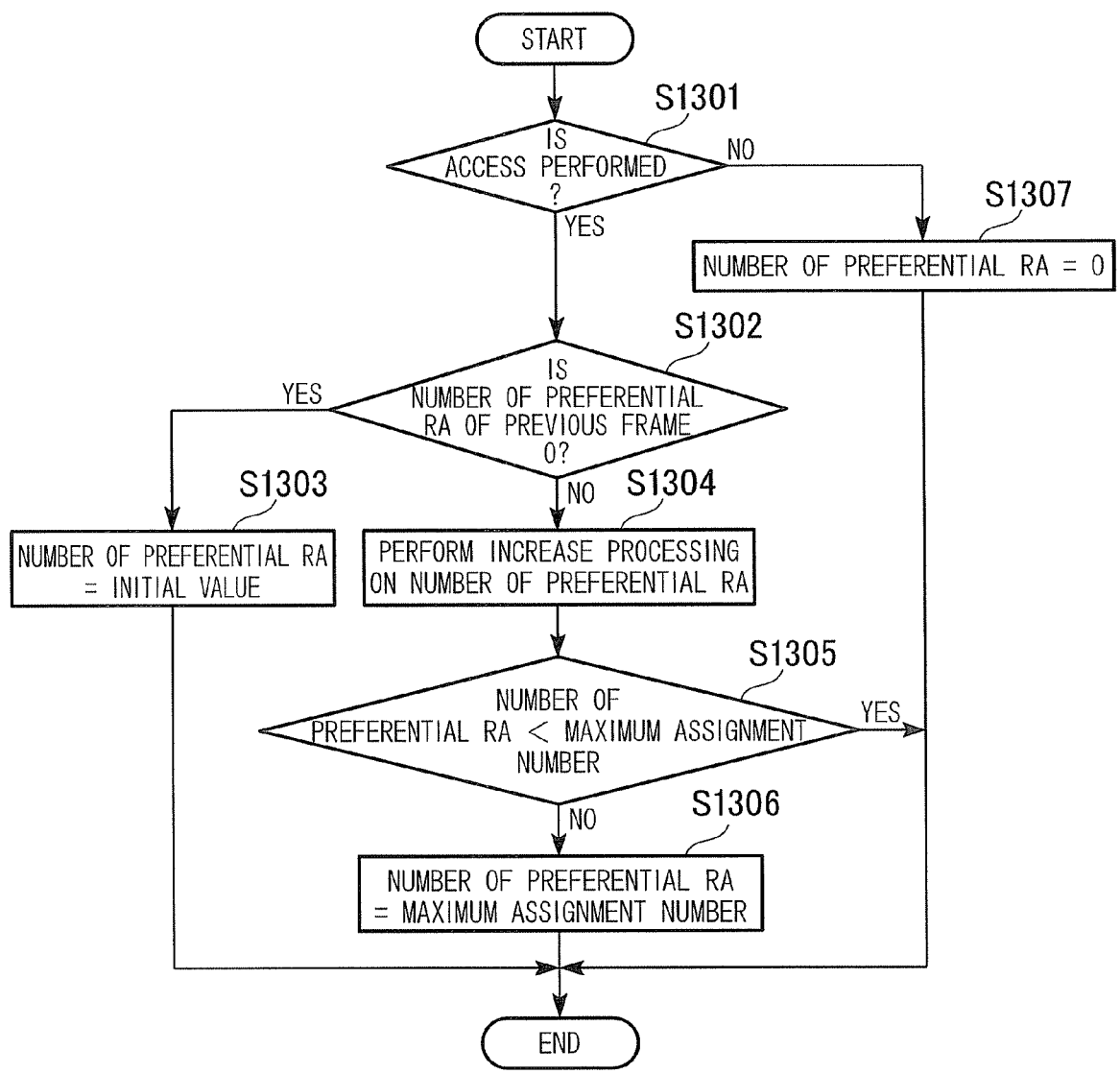
FIG. 13 is a flowchart showing a procedure of determining the number of preferential RA in the base station 1 in a first concrete example.

A method of determining the number of preferential RA in the first concrete example will be described with reference to FIG. 13. FIG. 13 is a flowchart showing a procedure of determining the number of preferential RA in the base station 1 in the present concrete example. In the present concrete example, the number of common slot for the preferential class is 1. Further, it is assumed that the common slot is received by a reception frame #N.

(Step S1301) The base-station transmission and reception manager 13 determines whether there is an access to the common slot or not. If it is determined that there is an access to the common slot, the process proceeds to step S1302, otherwise, the process proceeds to step S1307. The determination is made using the method shown in steps S201 to S208.

(Step S1302) The base-station transmission and reception manager 13 determines whether the number of the preferential RA in previous frame #(N−1) was 0 or not. If it is determined that the number of the preferential RA was 0, the process proceeds to step S1303 and, otherwise, the process proceeds to step S1304.

(Step S1303) The base-station transmission and reception manager 13 sets the number of preferential RA of the preferential class in frame #(N+1) subsequent to frame #N to an initial value (a defined value). The process then ends.

(Step S1304) Since there was the assignment of the number of preferential RA in frame #(N−1), the base-station transmission and reception manager 13 performs increase processing on the number of preferential RA in frame #(N−1) to calculate the number of preferential RA in frame #(N+1). The process then proceeds to step S1305.

In addition, all increase controls such as exponential growth, power increase, logarithmic increase, and linear increase can be applied as increase processing. For example, in the case of linear increase processing, the number of preferential RA of the frame #(N+1) is equal to the number of preferential RA of frame #(N−1)+α (defined value).

(Step S1305) The base-station transmission and reception manager 13 compares the number of preferential RA of the frame #(N+1) calculated in step S1304 with a maximum assignment number (defined value) that can be assigned to the preferential class in one frame. If the number of preferential RA is less than the maximum assignment number, the process ends and, otherwise, the process proceeds to step S1306.

(Step S1306) The base-station transmission and reception manager 13 changes the number of preferential RA of the frame #(N+1) into the maximum assignment number that can be assigned to the preferential class in one frame. The process then ends.

(Step S1307) The base-station transmission and reception manager 13 sets the number of preferential RA of the preferential class in frame #(N+1) to 0. That is, the RA area is not reserved. The process then ends.

As described above, the base station 1 can determine the number of preferential RA. Further, if there are a plurality of common slots for the preferential class, the base station 1 receives all the common slots for the preferential class and then performs processing in steps S1301 to S1307. In this case, it is determined in step S1301 that there is access when there is access in at least one of the plurality of common slots.

Figure 14:
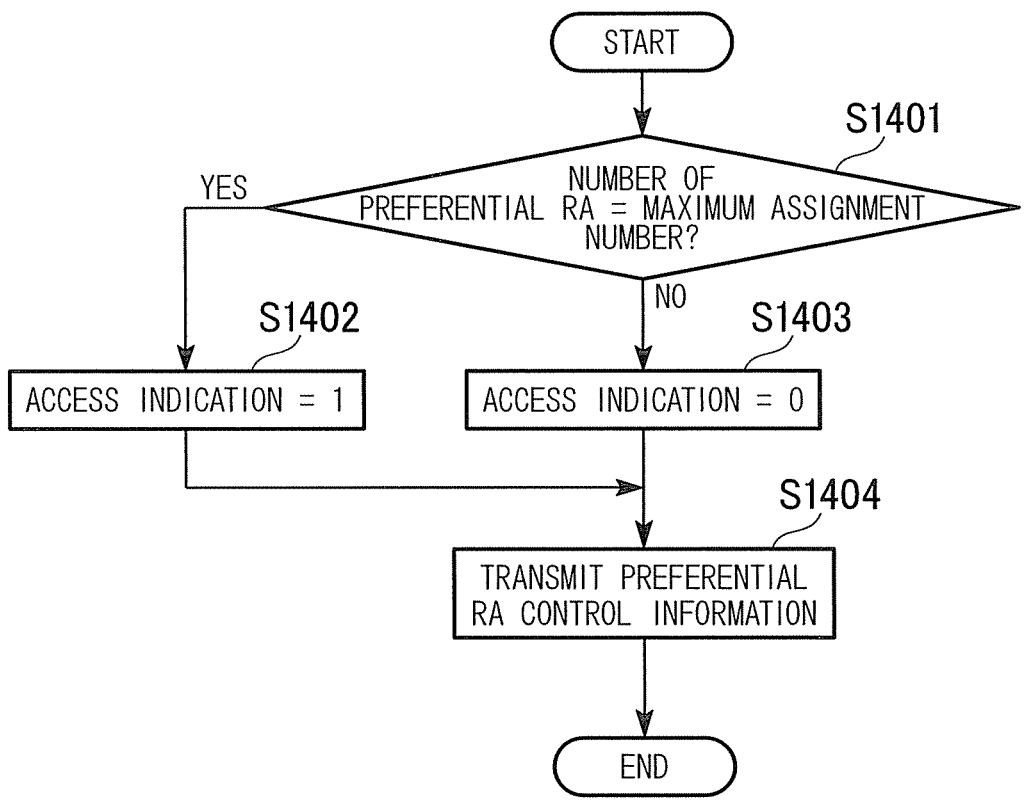
FIG. 14 is a flowchart showing a procedure by which the base station 1 determines an accessing method for a wireless terminal 2 in the first concrete example.

Next, a procedure of determining an accessing method for the wireless terminal 2 in the base station 1 in the first concrete example will be described with reference to FIG. 14. The base-station transmission and reception manager 13 determines the number of preferential RA and then selects, in frame #N, the accessing method for the wireless terminal 2 in the preferential class in #(N+1).

(Step S1401) The base-station transmission and reception manager 13 determines whether the number of preferential RA is equal to the maximum assignment number that can be assigned to the preferential class in one frame or not. If it is determined that the number of preferential RA is equal to the maximum assignment number, the process proceeds to step S1402, otherwise, the process proceeds to step S1403.

(Step S1402) Since the number of preferential RA has reached the maximum assignment number, the base-station transmission and reception manager 13 instructs the wireless terminal 2 to access using a plurality of frames. Accordingly, the base-station transmission and reception manager 13 sets the access indication to "1." The process then proceeds to step S1404. Further, as the access indication, two types for an odd frame and an even frame for each preferential class are prepared, and a corresponding one of the two types according to the frame number of frame #(N+1) is applied.

(Step S1403) Since the number of preferential RA has not reached the maximum assignment number, the base-station transmission and reception manager 13 instructs the wireless terminal 2 to access using one frame (frame #(N+1)). Accordingly, the base-station transmission and reception manager 13 sets the access indication to "0." The process then proceeds to step S1404.

(Step S1404) The base-station transmission and reception manager 13 produces preferential RA control information and broadcasts the produced preferential RA control information to the wireless terminal 2 in RFch of frame #(N+1). The process then ends.

As described above, the base station 1 can transmit the preferential RA control information to the wireless terminal 2.

Figure 15:
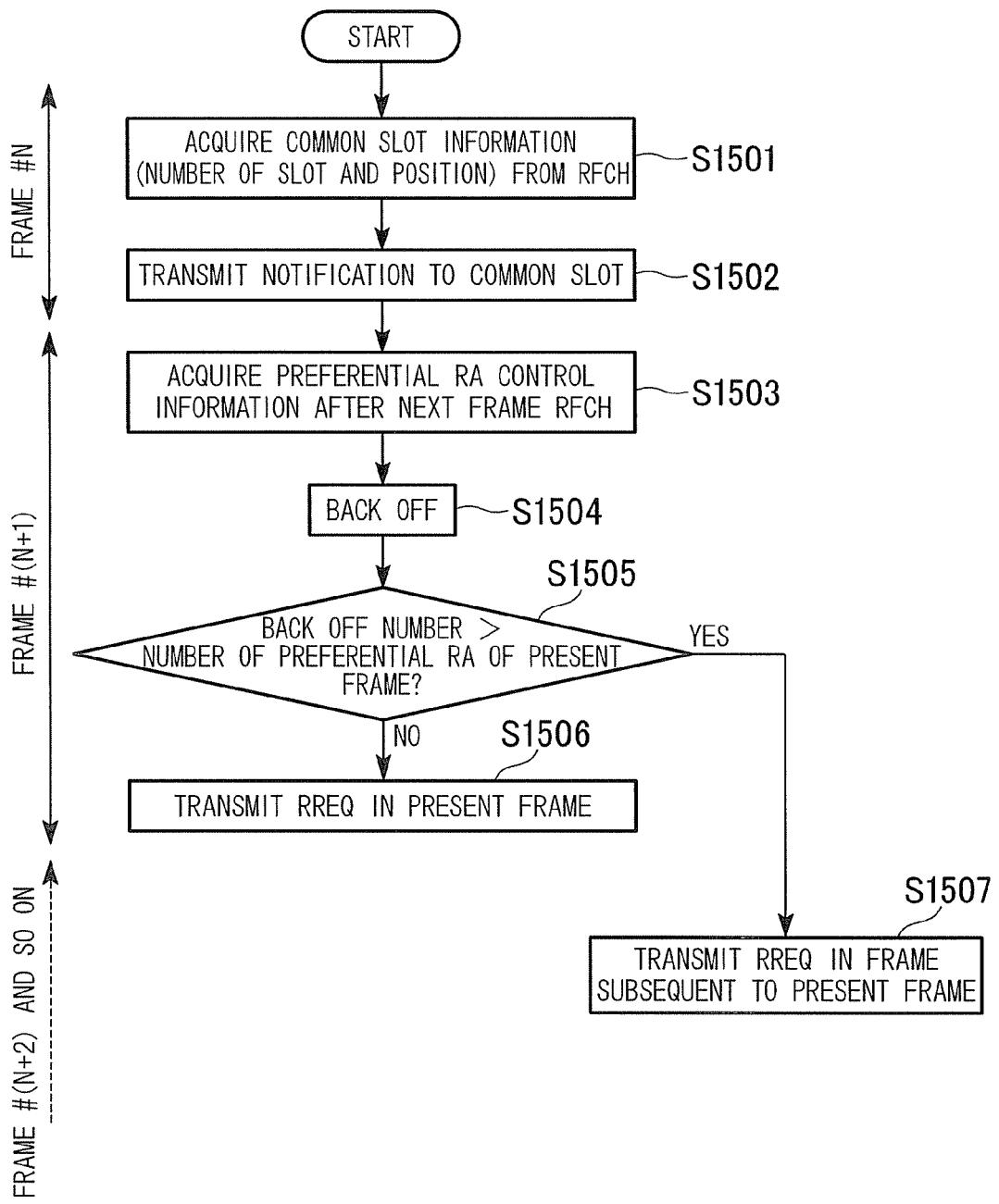
FIG. 15 is a flowchart showing a procedure by which the wireless terminal 2 transmits RREQ to the base station 1 in the first concrete example.

Next, a procedure by which the wireless terminal 2 transmits RREQ to the base station 1 in the first concrete example will be described with reference to FIG. 15. The wireless terminal 2 transmits RREQ to the base station 1 upon generation of the traffic in the preferential class or upon retransmission. In addition, in the present concrete example, a configuration of a frame transmitted using the common slot is the same as in FIG. 5A.

(Step S1501) The wireless terminal 2 acquires common slot information (the number and position of the common slots) for the preferential class from RFch of frame #N. The process then proceeds to step S1502.

(Step S1502) The wireless terminal 2 transmits the notification to the common slot indicated by the common slot information acquired in step S1501 according to a defined format. The process then proceeds to step S1503.

(Step S1503) The wireless terminal 2 receives the preferential RA control information from RFch of frame #(N+1) and acquires an access indication for the preferential class and the number of preferential RA. The process then proceeds to step S1504.

(Step S1504) Since the access indication "0" is an indication of a transmission of RREQ using the present frame, the wireless terminal 2 sets the number of preferential RA to the size of an initial back off window (IBW) and determines a back off number which is uniformly random number to be constant in the number of preferential RA. Further, since the access indication "1" is an indication of a transmission of RREQ using a plurality of frames subsequent to a next frame, the wireless terminal 2 performs increase processing on the IBW size and updates the IBW size. Further, when the access indication is "1" and the back off is initiated, the wireless terminal 2 transmits a notification to the common slot to notify the base station that there is traffic for the preferential RA. The process then proceeds to step S1505.

All increase controls such as exponential growth, power increase, logarithmic increase, and linear increase can be applied as increase processing. For example, in the case where an initial value of the IBW size is the maximum assignment number (the number of the preferential RA when the access indications is "1"), the back off window size is equal to IBW ×2 when increase processing using power-of-two increase is performed. As shown in FIG. 12, since the present embodiment involves a sequence in which the transmission to common slot is first performed to access the preferential RA of a next frame, back off control is initiated at intervals of one frame when the access indication is "1."

(Step S1505) The wireless terminal 2 determines whether the back off number determined in step S1506 is greater than the number of preferential RA of the frame #(N+1) or not. If the back off number is greater than the number of preferential RA of the frame #(N+1), the process proceeds to step S1507 and, otherwise, the process proceeds to step S1506.

(Step S1506) The wireless terminal 2 transmits RREQ using preferential RA of frame #(N+1). The process then ends.

(Step S1507) The wireless terminal 2 transmits RREQ using a preferential RA of the frame #(N+2) and so on. The process then ends.

After transmitting RREQ using the preferential RA, the wireless terminal 2 receives RFch of a next frame and determines whether the transmission is successful based on the information included in the received RFch or not. If it is determined that the transmission is successful, the wireless terminal 2 awaits assignment of Dch for data transmission. On the other hand, if it is determined that the transmission is not successful, the wireless terminal 2 again performs processing in steps S1501 to S1507 to retransmit RREQ.

As described above, according to the present concrete example, the base station 1 receives the notification of the occurrence of the immediate event from the wireless terminal 2 and dynamically changes the assignment of Rchs included in the RA period based on the received notification, such that enough Rchs can be assigned to the immediate event. Further, the wireless terminal 2 can transmit RREQ to the base station 1 using the assigned Rchs. Accordingly, the wireless terminal 2 can transmit a bandwidth request message (RREQ), which is a message to request a bandwidth used for a given event such as an event with an immediacy requirement, to the base station 1 with a short delay time.

SECOND CONCRETE EXAMPLE

Figure 16:
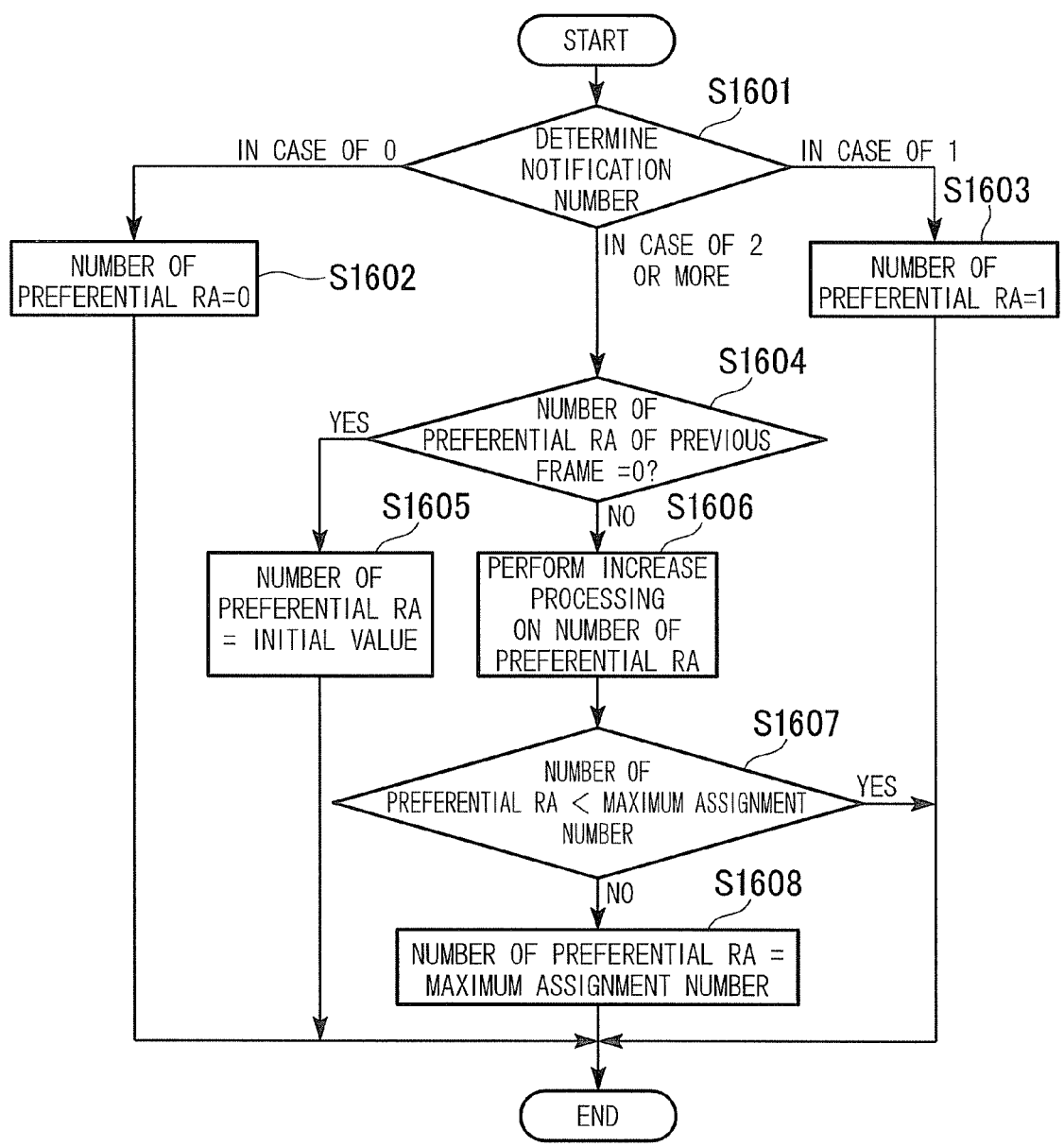
FIG. 16 is a flowchart showing a procedure of determining the number of preferential RA in a base station 1 in a second concrete example.

A method of determining the number of preferential RA in a second concrete example will be described with reference to FIG. 16. FIG. 16 is a flowchart showing a procedure of determining the number of preferential RA in a base station 1 in the present concrete example. In the present concrete example, processing varies according to three types of accesses: "there is no access to a common slot," "there is an access to a common slot from one wireless terminal," and "there is an access to a common slot from two or more wireless terminals" as the result of accessing the common slot.

In the present concrete example, the number of common slot for the preferential class is 1. Further, it is assumed that the common slot is received by a reception frame #N. In the present concrete example, a configuration of a frame transmitted using the common slot is the same as shown in FIG. 5B.

(Step S1601) The base-station transmission and reception manager 13 determines whether there is an access to the common slot or not. If there is an access to the common slot, the base-station transmission and reception manager 13 also determines how many wireless terminals 2 have access to the common slot. If it is determined that there is no access to the common slot, the process proceeds to step S1602. If it is determined that there is an access to the common slot from one wireless terminal 2, the process proceeds to step S1603. If it is determined that there is an access to the common slot from two or more wireless terminals 2, the process proceeds to step S1604. The determination is made based on the method described in steps S201 to S208.

(Step S1602) The base-station transmission and reception manager 13 sets the number of preferential RA of a preferential class in frame #(N+1) subsequent to frame #N to 0. The process then ends.

(Step S1603) The base-station transmission and reception manager 13 sets the number of preferential RA of the preferential class in frame #(N+1) to 1. The process then ends.

(Step S1604) The base-station transmission and reception manager 13 determines whether the number of the preferential RA in previous frame #(N−1) was 0 or not. If it is determined that the number of the preferential RA was 0, the process proceeds to step S1605, otherwise, the process proceeds to step S1606.

(Step S1605) The base-station transmission and reception manager 13 sets the number of preferential RA of the preferential class in frame #(N+1) subsequent to frame #N to an initial value (a defined value). The process then ends.

(Step S1606) Since there was the assignment of the number of preferential RA in frame #(N−1), the base-station transmission and reception manager 13 performs increase processing on the number of preferential RA in frame #(N−1) to calculate the number of preferential RA in frame #(N+1). The process then proceeds to step S1607.

All increase controls such as exponential increase, power increase, logarithmic increase and linear increase can be applied as increase processing. For example, in the case of linear increase processing, the number of preferential RA of the frame #(N+1) is equal to the number of preferential RA of frame #(N−1)+α (defined value).

(Step S1607) The base-station transmission and reception manager 13 compares the number of preferential RA of frame #(N+1) calculated in step S1606 with a maximum assignment number (a defined value) that can be assigned to the preferential class in one frame. If it is determined that the number of preferential RA is less than the maximum assignment number, the process ends and, otherwise, the process proceeds to step S1608.

(Step S1608) The base-station transmission and reception manager 13 changes the number of preferential RA of the frame #(N+1) to the maximum assignment number that can be assigned to the preferential class in one frame. The process then ends.

A procedure of determining an accessing method for the wireless terminal 2 in the base station 1 and a procedure by which the wireless terminal 2 transmits RREQ to the base station 1 are the same as in the first concrete example.

As described above, according to the present concrete example, the base station 1 receives the notification of the occurrence of the immediate event from the wireless terminal 2 and dynamically changes the assignment of Rchs included in the RA period based on the received notification, such that the base station 1 can assign enough Rchs to the immediate event. In this case, in the present concrete example, it is possible to determine the number of preferential RA according to the three accesses: "there is no access to the common slot," "there is an access to the common slot from one wireless terminal," and "there is an access to the common slot from two or more wireless terminals." Further, the wireless terminal 2 can transmit RREQ to the base station 1 using the assigned Rchs. Accordingly, the wireless terminal device can transmit a bandwidth request message (RREQ), which is a message to request a bandwidth used for a given event such as an event with an immediacy requirement, to the base station apparatus with a short delay time.

When there are a plurality of common slots for the preferential class, the base station 1 receives all the common slots for the preferential class and then performs processing in steps S1601 to S1608. In this case, if it is determined that there is access from two or more wireless terminals 2 in at least one common slot in the notification number determination process, the process proceeds to step S1604 that is a branch to "there is an access to the common slot from two or more wireless terminals." Otherwise, since the access number can be specified, the number of preferential RA is reserved by the specified access number.

In the present embodiment, in order to control a preferential RA area for each preferential class, even when there are a plurality of preferential classes, it is possible to perform independent control for each preferential class.

In the present embodiment, since the wireless terminal 2 initially transmits a notification to the common slot to access the preferential RA in a next frame, the preferential RA is accessed at intervals of one frame upon retransmission. Here, the following method is used to shorten the time to access the preferential RA by making every frame access to the preferential RA possible.

Specifically, the wireless terminal 2 transmits the notification to the common slot in continutive two frames (frames #N and #(N+1)) upon transmission initiation. The wireless terminal 2 transmits RREQ in the preferential RA of frame #(N+1). If the access to the preferential RA fails (which is detected in frame #(N+2)), RREQ can be retransmitted to the preferential RA because the notification is transmitted to the common slot in frame #(N+1). Accordingly, there is the assignment of the preferential RA in frame #(N+2), such that RREQ can be retransmitted to the preferential RA. However, since the access to the preferential RA fails in frame #(N+2), the notification is transmitted to the common slot in the present frame for RREQ retransmission.

Figure 17:
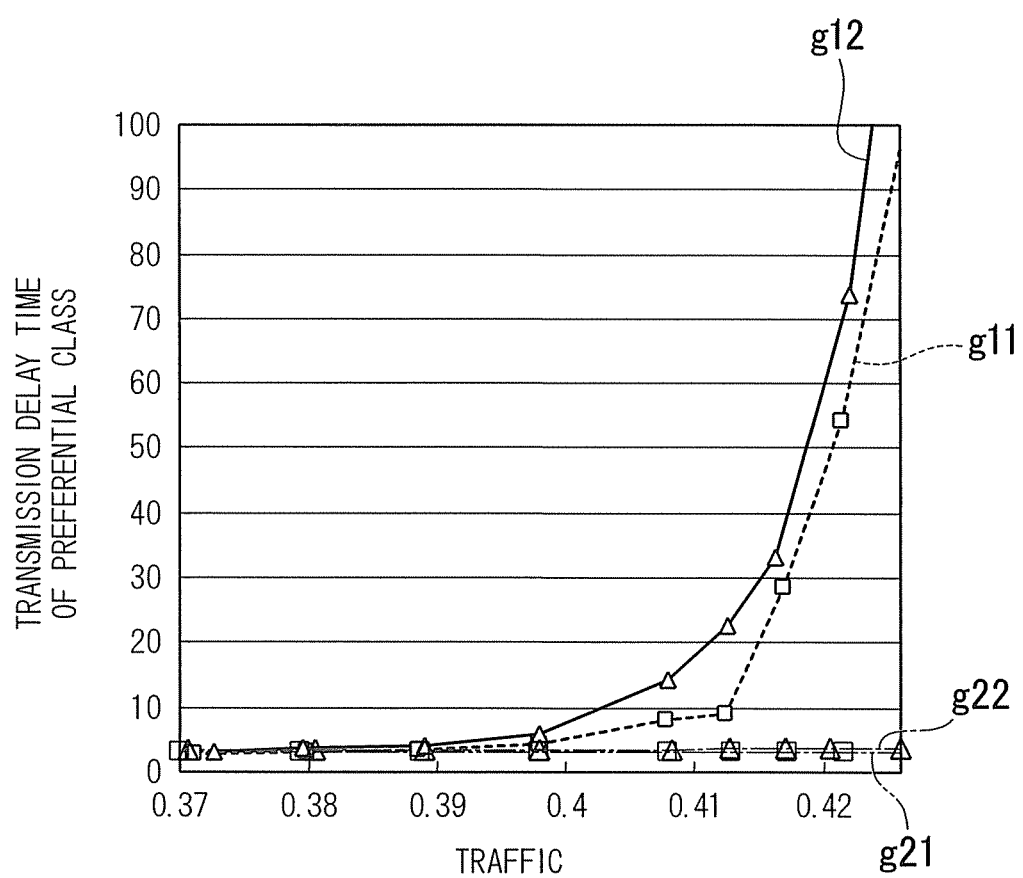
FIG. 17 shows a simulation result showing a relationship between traffic and a transmission delay time of a preferential class in the case where the wireless communication system according to the first embodiment of the present invention is used.

Next, effects in the case where the first embodiment of the present invention is used will be described with reference to FIG. 17. FIG. 17 shows a simulation result showing a relationship between traffic and a transmission delay time of the preferential class in the case where the wireless communication system according to the first embodiment of the present invention is used. In FIG. 17, the horizontal axis indicates the traffic and the vertical axis indicates a transmission delay time (seconds) of the wireless terminal 2 in the preferential class.

In FIG. 17, a graph g21 shows a property when preferential traffic is 0.01 in the case where a wireless communication system according to the first embodiment of the present invention is used. Further, a graph g22 shows a property when the preferential traffic is 0.05 in the case where a wireless communication system according to the first embodiment of the present invention is used.

Further, a graph g11 shows a property when the preferential traffic is 0.01 when a wireless communication system according to conventional art is used. Further, a graph g12 shows a property when the preferential traffic is 0.05 when a wireless communication system according to conventional art is used.

Where there are two wireless terminals 2 in the preferential class and the non-preferential class, the delay time of the wireless terminal 2 in the preferential class was evaluated as shown in FIG. 17. The delay time is a time taken from generation of data in the wireless terminal 2 to reception of data in the base station 1.

Here, traffic is normalized to a transmission capacity (9600 bps), and traffic of a wireless terminal 2 in the non-preferential class is changed with respect to a traffic model having wireless terminals 2 in the two preferential classes of 0.01 and 0.05. The data generation in the wireless terminal 2 follows a Poisson distribution (360 seconds in average), and a data length is 320 bits.

In the wireless communication system according to conventional art, IBW is set to 8 in the preferential class and 32 in the non-preferential class. Further, as other parameters, the transmission rate is 9600 bps and the length of frame is 1 second.

In a wireless communication system according to conventional art, since a transmission delay time increases with traffic as shown in the graphs g11 and g12 of FIG. 17, it is clear that the system cannot provide the low delay transmission.

On the other hand, since the wireless communication system according to the first embodiment of the present invention maintains a constant delay time (4 seconds or less) irrespective of variation of traffic, it is obvious that the system can provide the transmission with a short delay time, as shown in the graphs g21 and g22 of FIG. 17.

Second Embodiment

Next, a wireless communication system according to a second embodiment of the present invention will be described. The wireless communication system according to the second embodiment includes a base station 1 and a wireless terminal 2, as in the first embodiment. Description of similarities between the second embodiment and the first embodiment will be omitted.

Figure 18:
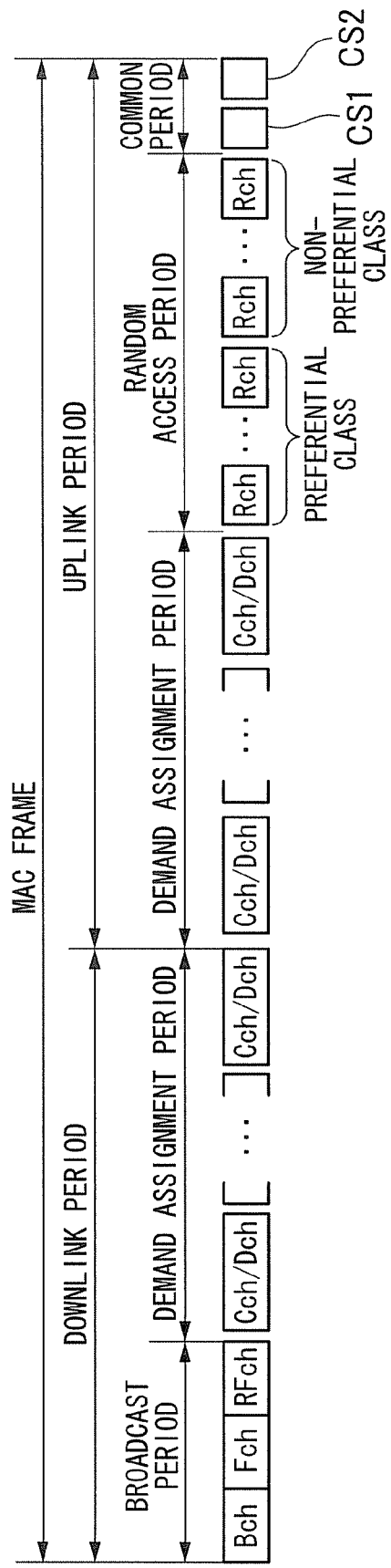
FIG. 18 shows a configuration of a MAC frame including a common access slot in a second embodiment of the present invention.

FIG. 18 shows a configuration of a MAC frame including a common access slot in the second embodiment of the present invention. In the second embodiment, two common slots are assigned to a wireless terminal 2 in a preferential class. Accordingly, the MAC frame configuration (FIG. 18) according to the second embodiment is substantially the same as the MAC frame configuration (FIG. 4) according to the first embodiment. However, the first embodiment and the second embodiment differ in that the MAC frame in the former has one common slot while the MAC frame in the latter has two common slots (a first common slot CS1 and a second common slot CS2). Although the MAC frame in the second embodiment has two common slots, it is not limited thereto and the MAC frame may have three or more common slots.

Next, a flow of a transmission process in the wireless terminal 2 in the case where the wireless terminal 2 notifies the base station 1 of an occurrence of an event with an immediacy requirement (hereinafter, referred to as immediate event) will be described.

In the wireless terminal 2 synchronized with the MAC frame that performs transmission and reception, the terminal transmission and reception manager 23 acquires common slot information based on data that the terminal transceiver 21 receives from the base station 1. Subsequently, the terminal transmission and reception manager 23 notifies the terminal common-slot manager 24 of the common slot information. The terminal common-slot manager 24 specifies respective start positions of two common slots (common slots CS1 and CS2 in FIG. 18) corresponding to the immediate event based on the common slot information, and notifies the terminal transmission and reception manager 23 of the start positions of the two common slots.

Subsequently, the terminal transmission and reception manager 23 notifies the terminal transmission and reception controller 25 of the start positions of the two common slots. The terminal transmission and reception controller 25 calculates a data transmission timing to notify of the occurrence of the immediate event from the start positions of the common slots corresponding to a transmission history. Here, when the wireless terminal 2 notifies of a new immediate event, the wireless terminal 2 uses the common slot CS1 for a new notification (see FIG. 18). Meanwhile, when the immediate event notification is retransmitted, the common slot CS2 for retransmission (see FIG. 18) is used. Accordingly, it is possible to identify whether the immediate event notification is a new notification or a retransmitted notification from the wireless terminal 2 based on which of the common slot CS1 and the common slot CS2 is used to transmit the immediate event notification from the wireless terminal 2. That is, the base station 1 can identify a transmission history of the wireless terminal 2.

In FIG. 18, when the common slot CS1 is used for the new notification, the common slot CS2 next to CS1 is used for the retransmission. Alternatively, the common slot CS2 may be used for the new notification and the common slot CS1 may be used for the retransmission.

The terminal transmission and reception manager 23 notifies the terminal frame creating and disassembling unit 22 of the type of the immediate event. The terminal frame creating and disassembling unit 22 creates PDU from the type of the immediate event and notifies the terminal transceiver 21 of PDU. Subsequently, the terminal transceiver 21 transmits PDU to the base station 1 at a timing indicated by the terminal transmission and reception controller 25, and terminates the process.

Meanwhile, a reception process for the two common slots CS1 and CS2 is performed in the reception process in the base station 1.

For the common slot CS1 for a new notification, the base station 1 performs the process of FIG. 8 described in the first embodiment. However, while it is determined as "an event notification" in step S206 of FIG. 8 in the first embodiment, it is determined as "a new notification of an event" in step S206 of FIG. 8 in the second embodiment.

Further, while it is determined as "an event non-notification" in step S208 of FIG. 8 in the first embodiment, it is determined that "there is no new notification of an event" in step S208 of FIG. 8 in the second embodiment.

For the retransmission common slot CS2, the base station 1 performs the process of FIG. 8 described in the first embodiment. However, while it is determined as "an event notification" in step S206 of FIG. 8 in the first embodiment, it is determined as "a retransmission notification of event" in step S206 of FIG. 8 in the second embodiment.

While it is determined as an "event non-notification" in step S208 of FIG. 8 in the first embodiment, it is determined that "there is no retransmission notification of an event" in step S208 of FIG. 8 in the second embodiment.

Figure 19:
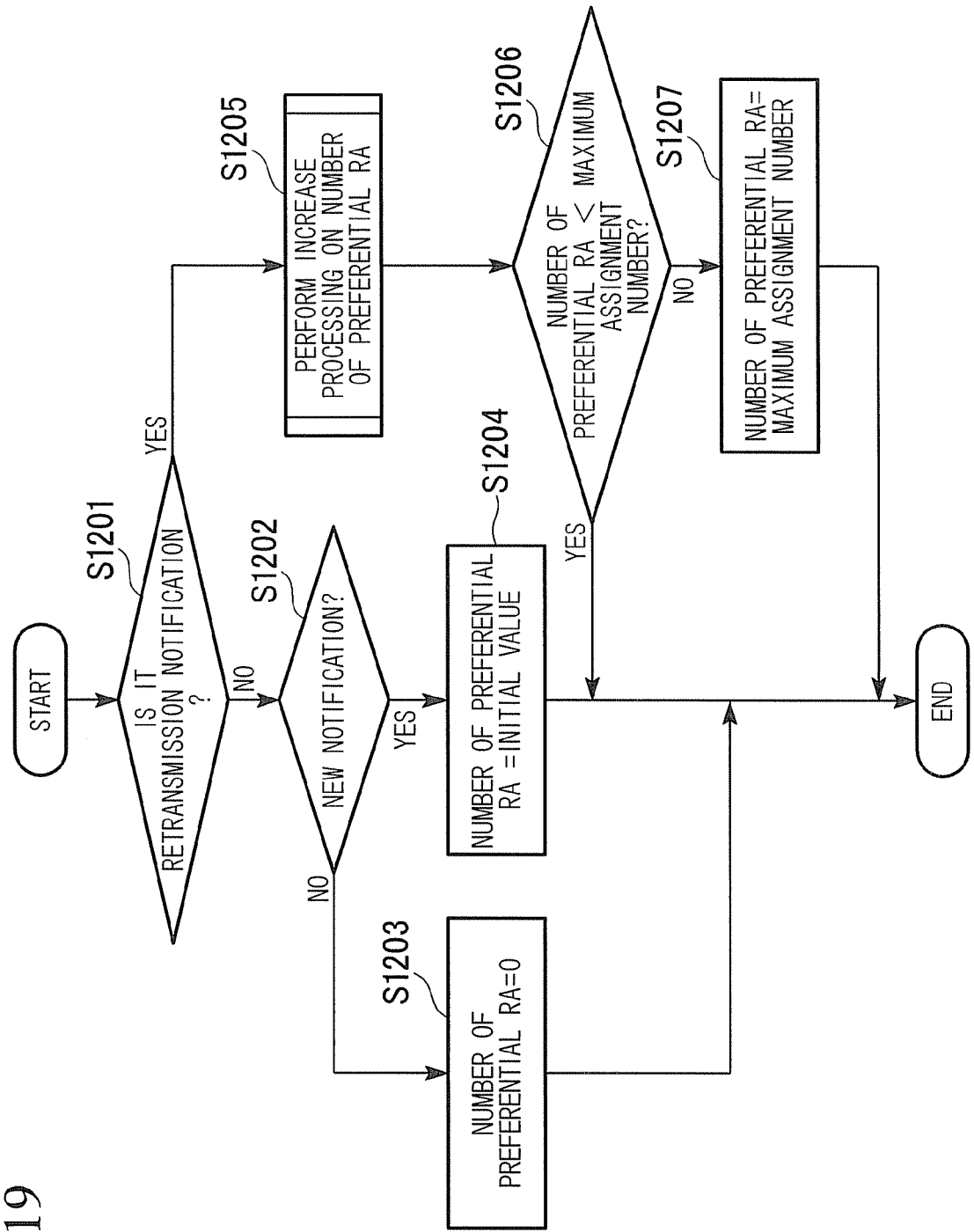
FIG. 19 is a flowchart showing a procedure of determining the number of preferential RA in the base station 1 in the second embodiment of the present invention.

FIG. 19 is a flowchart showing a procedure of determining the number of preferential RA in the base station 1 in the second embodiment of the present invention. In the second embodiment, the base station 1 determines the number of preferential RA of a next frame #N+1 in a process of receiving a common slot in frame #N.

Initially, when the base station 1 detects a retransmission notification irrespective of whether there is a new notification in the reception process or not (step S1201), the base station 1 increases the number of preferential RA assigned to frame #N+1 than the number of preferential RA assigned to frame #N−1 (step S1205).

When the base station 1 performs processing in step S1205, the base station 1 checks whether the number of preferential RA of the frame #N+1 is smaller than a maximum assignment number or not (step S1206). Here, the maximum assignment number is a maximum number of RA that can be assigned to frame #N+1.

When the number of preferential RA is smaller than the maximum assignment number in step S1206, the process of the flowchart in FIG. 19 ends. On the other hand, when the number of preferential RA is equal to or greater than the maximum assignment number in step S1206, the base station 1 assigns the number of preferential RA equal to the maximum assignment number to frame #N+1 (step S1207).

Meanwhile, when the base station 1 does not detect the retransmission notification in step S1201 and does not detect the new notification (step S1202), the base station 1 sets the number of preferential RA assigned to frame #N+1 to 0 (step S1203). That is, the base station 1 does not assign the preferential RA to frame #N+1.

On the other hand, when the base station 1 detects the new notification in step S1202, the base station 1 assigns the number of preferential RA equal to a previously determined initial value to frame #N+1 (step S1204).

Although the base station 1 assigns the number of preferential RA equal to the previously determined initial value to frame #N+1 in step S1204 of FIG. 19, the present invention is not limited thereto.

For example, the base station 1 may check whether there has been the assignment of the preferential RA in frame #N−1 or not. In the case where there has been the assignment of the preferential RA in frame #N−1, the number of RA equal to the number of RA assigned to frame #N−1 may be assigned to frame #N+1. In the case where there has been no assignment of the preferential RA in frame #N−1, the base station 1 may assign the number of preferential RA equal to the previously determined initial value to frame #N+1.

Figure 20:
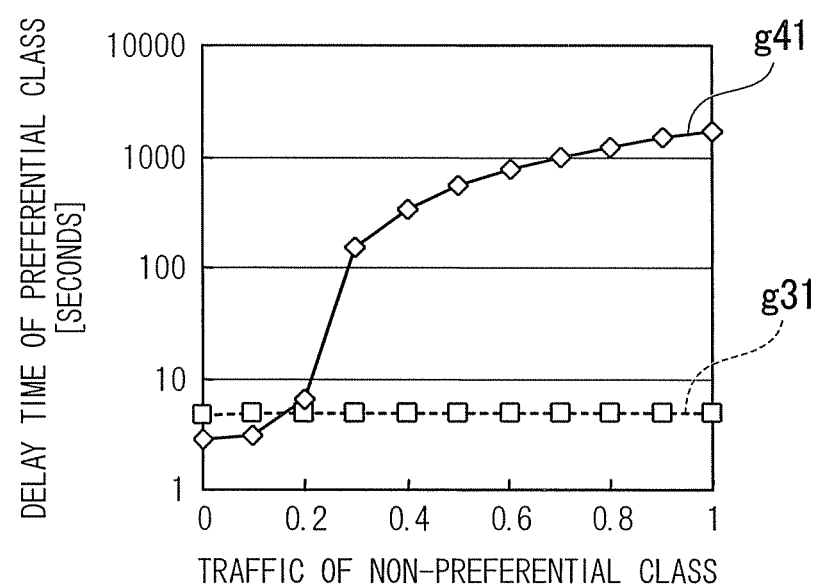
FIG. 20 is a simulation result showing a relationship between traffic of a wireless terminal 2 in a non-preferential class and a delay time of a wireless terminal 2 in a preferential class in the case where the second embodiment of the present invention is used.
Figure 21:
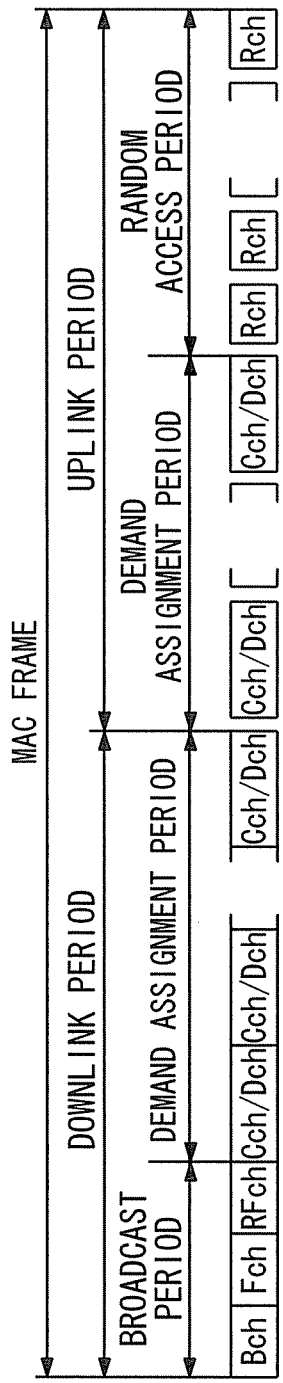
FIG. 21 shows an example of a configuration of a frame in a conventional art.
Figure 22:
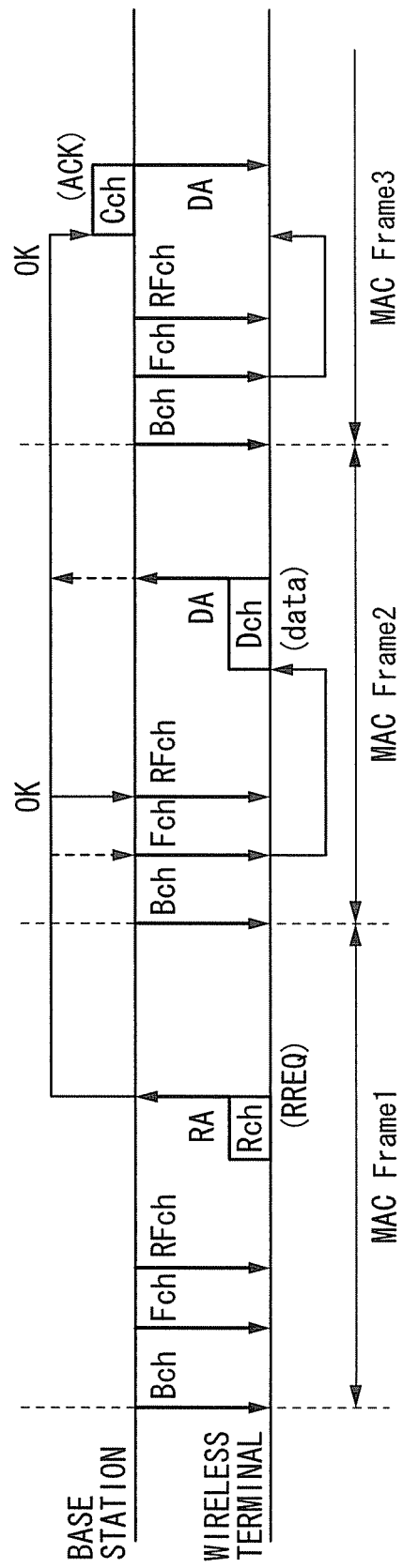
FIG. 22 shows an example of an access sequence in a conventional art.

Next, effects when the second embodiment of the present invention is used will be described with reference to FIG. 20. FIG. 20 is a simulation result showing a relationship between traffic of the wireless terminal 2 in the non-preferential class and a delay time of the wireless terminal 2 in the preferential class in the case where the second embodiment of the present invention is used. In FIG. 20, the horizontal axis indicates the traffic of the wireless terminal 2 in the non-preferential class and the vertical axis indicates the delay time (seconds) of the wireless terminal 2 in the preferential class.

In FIG. 20, a graph g31 shows a property in the case where a wireless communication system according to the second embodiment of the present invention is used.

Further, a graph g41 shows a property in the case where a wireless communication system according to conventional art is used.

Where there are two wireless terminals, which are a wireless terminal 2 in the preferential class and a wireless terminal 2 in the non-preferential class, the delay time of the wireless terminal 2 in the preferential class was evaluated to obtain the simulation result shown in FIG. 20. The delay time is a time taken from data generation in the wireless terminal 2 to data reception in the base station 1.

In the simulation, the delay time of the wireless terminal 2 in the preferential class is defined as 10 seconds. Further, the delay time of the wireless terminal 2 in the non-preferential class is not defined.

The traffic of the wireless terminal 2 in the preferential class is fixed (to 0.2) and traffic of the wireless terminal 2 in the non-preferential class is changed.

In this traffic model, the data generation follows a Poisson distribution (333.3 seconds in average), and a data length is 320 bits. For the traffic, a transmission capacity is normalized to 9600 bits.

In a wireless communication system according to conventional art, IBW is 8 in the preferential class and 1024 in the non-preferential class. As other parameters, the transmission rate is 9600 bps and the length of frame is 1 second.

In the wireless communication system according to conventional art, as the traffic of the wireless terminal in the non-preferential class increases, the delay time of the wireless terminal in the preferential class increases, as shown in the graph g41 of FIG. 20. This means that a transmission quality of the wireless terminal in the preferential class cannot be guaranteed.

On the other end, in the wireless communication system according to the second embodiment of the present invention, since the delay time of the wireless terminal 2 in the preferential class is constant irrespective of the traffic of the wireless terminal 2 in the non-preferential class, it is clear that the transmission quality of the wireless terminal 2 in the preferential class can be guaranteed.

Although the embodiments of the present invention have been described in detail with reference to the accompanying drawings, a detailed configurations are not limited thereto. That is, various modifications can be made to the above-described embodiments of the present invention without departing from the scope of the invention.

INDUSTRIAL APPLICABILITY

The present invention is applied to a wireless communication method, a base station apparatus and a wireless communication system in which a wireless terminal device transmits a bandwidth request message for a given event such as event with an immediacy requirement to a base station apparatus with a short delay time.

The invention claimed is:

1. A wireless communication method in which a plurality of wireless terminal devices are connected to a base station apparatus via a common wireless line, the base station apparatus managing an assignable period for wireless terminal device in an uplink communication period of first to third wireless frames as a demand assignment period, managing a remaining period as a random access period, and assigning a requested uplink communication bandwidth according to bandwidth request information from the wireless terminal device, and the wireless terminal device transmitting the bandwidth request information using a random slot in the random access period in case that data to transmit is generated, and transmitting the data using the bandwidth assigned to an uplink demand assignment period from the base station apparatus in case that the bandwidth request information is successfully transmitted, wherein the first to third wireless frames further comprise a common slot for transmitting information notifying of an occurrence of a given event, the first to third wireless frames being transmitted, from the wireless terminal device to the base station apparatus, in order of the first wireless frame, the second wireless frame and the third wireless frame, and the method comprises:

transmitting, by the wireless terminal device, information indicating the occurrence of the given event in the wireless terminal device to the base station apparatus using the common slot;

determining, by the base station apparatus, the number of random slots assigned as random slots to transmit the bandwidth request information for the given event among random slots in the random access period of the third wireless frame, in case that the base station apparatus receives, from the wireless terminal device, the information, the determination being performed based on the number of random slots included in the first wireless frame transmitted from the wireless terminal device to the base station apparatus;

transmitting, by the base station apparatus, information on the assigned random slots to the wireless terminal device of random access period; and transmitting, by the wireless terminal device, the bandwidth request information to the base station apparatus using the assigned random slots of the third wireless frame.

2. The wireless communication method according to claim 1, wherein in case that the occurrence of a given event is notified in the transmission of the information indicating the occurrence of the given event, the base station apparatus changes the number of the random slots assigned to the wireless terminal device.

3. The wireless communication method according to claim 1, wherein the base station apparatus changes the number of random slots assigned as random slots to the wireless terminal device, based on whether the information indicating the occurrence of the given event transmitted from the wireless terminal device in the transmission of the information indicating the occurrence of the given event is being retransmitted or not.

4. The wireless communication method according to claim 3, wherein the common slots have a first common slot and a second common slot, and in the transmission of the information indicating the occurrence of the given event, the wireless terminal device:

transmits the information indicating the occurrence of the given event using the first common slot in case that the information indicating the occurrence of the given event is not being retransmitted to the base station apparatus; and transmits the information indicating the occurrence of the given event using the second slot in case that the information indicating the occurrence of the given event is being retransmitted to the base station apparatus.

5. A base station apparatus configured to connect a plurality of wireless terminal devices via a common wireless line, managing an assignable period for wireless terminal device in an uplink communication period of first to third wireless frames as a demand assignment period, managing a remaining period as a random access period, and assigning a requested uplink communication bandwidth according to bandwidth request information from the wireless terminal device, wherein the first to third wireless frames further comprise a common slot for transmitting information notifying of an occurrence of a given event, the first to third wireless frames being transmitted, from the wireless terminal device to the base station apparatus, in order of the first wireless frame, the second wireless frame and the third wireless frame, and the base station apparatus comprises:

a base-station receiver configured to receive information indicating the occurrence of the given event in the wireless terminal device, the information being transmitted from the wireless terminal device using the common slot;

a base-station transmission and reception manager configured to determine the number of random slots assigned as random slots to transmit the bandwidth request information for the given event among random slots in the random access period of the third wireless frame, in case that the base-station receiver receives, from the wireless terminal device, the information, the determination being performed based on the number of random slots included in the first wireless frame transmitted from the wireless terminal device to the base station apparatus; and a base-station transmitter configured to transmit, in the base station apparatus, information on the assigned random slots to the wireless terminal device of random access period.

6. The base station apparatus according to claim 5, wherein in case that the base-station receiver detects the occurrence of the given event from the wireless terminal device, the base-station transmission and reception manager is configured to change the number of random slots assigned to the wireless terminal device.

7. The base station apparatus according to claim 5, wherein the base-station transmission and reception manager is configured to change the number of random slots assigned as random slots to the wireless terminal device based on whether the information indicating the occurrence of the given event transmitted from the wireless terminal device is being retransmitted or not.

8. A wireless communication system in which a plurality of wireless terminal devices are connected to a base station apparatus via a common wireless line, the base station apparatus managing an assignable period for wireless terminal device in an uplink communication period of first to third wireless frames as a demand assignment period and a remaining period as a random access period, managing assigning a requested uplink communication bandwidth according to bandwidth request information from the wireless terminal device, and the wireless terminal device transmitting the bandwidth request information using a random slot in the random access period in case that data to transmit is generated, and transmitting the data using the bandwidth assigned to an uplink demand assignment period form the base station apparatus in case that the bandwidth request information is successfully transmitted, wherein the first to third wireless frames further comprise a common slot for transmitting information notifying of an occurrence of a given event, the first to third wireless frames being transmitted, from the wireless terminal device to the base station apparatus, in order of the first wireless frame, the second wireless frame and the third wireless frame, the wireless terminal device comprises:

an event occurrence notification unit configured to transmit information indicating the occurrence of the given event in the wireless terminal device to the base station apparatus using the common slot; and a bandwidth requesting unit configured to transmit the bandwidth request information to the base station apparatus using random slots based on random slot assignment information transmitted from the base station apparatus, and the base station apparatus comprises:

a base-station receiver configured to receive information indicating the occurrence of the given event in the wireless terminal device, the information being transmitted from the wireless terminal device using the common slot;

a base-station transmission and reception manager configured to determine the number of random slots assigned as random slots to transmit the bandwidth request information for the given event among random slots in the random access period of the third wireless frame, in case that the base-station receiver receives, from the wireless terminal device, the information, the determination being performed based on the number of random slots included in the first wireless frame transmitted from the wireless terminal device to the base station apparatus; and a base-station transmitter configured to transmit, in the base station apparatus, information on the assigned random slots to the wireless terminal device of random access period.

9. The wireless communication system according to claim 8, wherein in case that the base-station receiver detects occurrence of a given event from the wireless terminal device, the base-station transmission and reception manager is configured to change the number of the random slots assigned to the wireless terminal device.

10. The wireless communication system according to claim 8, wherein the base-station transmission and reception manager is configured to change the number of random slots assigned as random slots to the wireless terminal device based on whether the information indicating the occurrence of the given event transmitted from the wireless terminal device is being retransmitted or not.

11. The wireless communication system according to claim 10, wherein the common slots have a first common slot and a second common slot, and the event occurrence notification unit is configured to transmit the information indicating the occurrence of the given event using the first common slot in case that the information indicating the occurrence of the given event is not retransmitted to the base station apparatus; and transmit the information indicating the occurrence of the given event using the second slot in case that the information indicating the occurrence of the given event is being retransmitted to the base station apparatus.

\* \* \* \* \*